US012562389B2

(12) United States Patent
Lee et al.

(10) Patent No.: US 12,562,389 B2
(45) Date of Patent: Feb. 24, 2026

(54) INTERMEDIATE PRODUCT OF ELECTRODE, ELECTRODE POWDER, ELECTRODE USING SAME, ELECTRODE PELLET USING SAME AND METHOD FOR PRODUCING EACH THEREOF

(71) Applicant: INDUSTRY-UNIVERSITY COOPERATION FOUNDATION HANYANG UNIVERSITY ERICA CAMPUS, Ansan-Si (KR)

(72) Inventors: Jung-Ho Lee, Ansan-si (KR); Sambhaji Shivaji Shinde, Ansan-si (KR); Dong-Hyung Kim, Ansan-si (KR)

(73) Assignee: INDUSTRY-UNIVERSITY COOPERATION FOUNDATION HANYANG UNIVERSITY ERICA CAMPUS, Ansan-Si (KR)

( * ) Notice: Subject to any disclaimer, the term of this patent is extended or adjusted under 35 U.S.C. 154(b) by 753 days.

(21) Appl. No.: 17/659,370

(22) Filed: Apr. 15, 2022

(65) Prior Publication Data

US 2022/0293917 A1      Sep. 15, 2022

Related U.S. Application Data

(63) Continuation of application No. PCT/KR2020/014078, filed on Oct. 15, 2020.

(30) Foreign Application Priority Data

Oct. 15, 2019      (KR) ........................ 10-2019-0127836

(51) Int. Cl.
*H01M 4/1395* (2010.01)
*C01B 25/37* (2006.01)
(Continued)

(52) U.S. Cl.
CPC ............. *H01M 4/66* (2013.01); *C01B 25/375* (2013.01); *H01M 4/0407* (2013.01); (Continued)

(58) Field of Classification Search
CPC ........... H01M 4/04–0497; H01M 4/139–1399; H01M 4/366
See application file for complete search history.

(56) References Cited

U.S. PATENT DOCUMENTS 6,558,848 B1      5/2003  Kobayashi et al.
6,794,087 B2      9/2004  Choi
(Continued)

FOREIGN PATENT DOCUMENTS

CN      1143839 A      2/1997
CN      1329373 A      1/2002
(Continued)

OTHER PUBLICATIONS

KR 10-2003-0030818 A. Apr. 18, 2003. English machine translation by EPO. (Year: 2003).*
(Continued)

*Primary Examiner* — James Lee
(74) *Attorney, Agent, or Firm* — Finch & Maloney PLLC

(57) ABSTRACT

Provided is a method for producing an intermediate product of an electrode. The method for producing an intermediate product of an electrode may comprise the steps of: preparing a base particle; forming a coating layer, comprising a first metal, on the surface of the base particle by mixing the base particle with a coating source which comprises the first metal; and forming a molten source, in which is melted a second metal and the base particle on which the coating layer is formed, by heat-treating the second metal and the base particle on which the coating layer is formed.

6 Claims, 23 Drawing Sheets

(51) Int. Cl.

| | |
|---|---|
| *H01M 4/04* | (2006.01) |
| *H01M 4/134* | (2010.01) |
| *H01M 4/36* | (2006.01) |
| *H01M 4/66* | (2006.01) |
| *H01M 10/0525* | (2010.01) |
| *H01M 10/0562* | (2010.01) |
| *H01M 4/02* | (2006.01) |

(52) U.S. Cl.

CPC ......... *H01M 4/134* (2013.01); *H01M 4/1395* (2013.01); *H01M 4/366* (2013.01); *H01M 10/0525* (2013.01); *H01M 10/0562* (2013.01); *C01P 2002/54* (2013.01); *C01P 2002/74* (2013.01); *H01M 2004/027* (2013.01)

(56) References Cited

U.S. PATENT DOCUMENTS

| | | | |
|---|---|---|---|
| 9,735,418 | B2 | 8/2017 | Woo et al. |
| 10,283,762 | B2 | 5/2019 | Hong et al. |
| 10,333,135 | B2 | 6/2019 | Paulsen et al. |
| 10,707,481 | B2 | 7/2020 | Lee et al. |
| 10,734,642 | B2 | 8/2020 | Zhamu et al. |
| 10,858,749 | B2 | 12/2020 | Park et al. |
| 11,021,367 | B2 | 6/2021 | Kang et al. |
| 11,316,145 | B2 | 4/2022 | Woo et al. |
| 12,107,216 | B2 | 10/2024 | Lee et al. |
| 2004/0042954 | A1 | 3/2004 | Park et al. |
| 2009/0269677 | A1 | 10/2009 | Hirose et al. |
| 2010/0323247 | A1 | 12/2010 | Takeshi et al. |
| 2011/0070500 | A1 | 3/2011 | Chen et al. |
| 2012/0043530 | A1 | 2/2012 | Badre et al. |
| 2012/0315550 | A1 | 12/2012 | Liu et al. |
| 2013/0149227 | A1 | 6/2013 | Chon et al. |
| 2013/0164611 | A1 | 6/2013 | Nanba et al. |
| 2014/0170303 | A1 | 6/2014 | Rayner et al. |
| 2014/0349187 | A1 | 11/2014 | Hirose et al. |
| 2014/0377653 | A1 | 12/2014 | Park et al. |
| 2015/0037689 | A1 | 2/2015 | Nishimura et al. |
| 2016/0301008 | A1 | 10/2016 | Mitchell et al. |
| 2017/0117538 | A1* | 4/2017 | Bendimerad ......... H01M 4/625 |
| 2017/0187066 | A1 | 6/2017 | Tsujimura et al. |
| 2017/0204241 | A1 | 7/2017 | Nicolay et al. |
| 2017/0244098 | A1* | 8/2017 | Duong ................... H01G 11/52 |
| 2018/0034038 | A1 | 2/2018 | Rogren |
| 2018/0190977 | A1 | 7/2018 | Park et al. |
| 2018/0241032 | A1 | 8/2018 | Pan et al. |
| 2018/0358654 | A1 | 12/2018 | Forsyth et al. |
| 2019/0027781 | A1 | 1/2019 | Lee et al. |
| 2019/0088986 | A1 | 3/2019 | Hu et al. |
| 2019/0379088 | A1 | 12/2019 | Schmidt et al. |
| 2020/0235427 | A1 | 7/2020 | Kim et al. |
| 2022/0158171 | A1* | 5/2022 | Ryu ................... H01M 10/0525 |

FOREIGN PATENT DOCUMENTS

| | | | |
|---|---|---|---|
| CN | 101567462 A | 10/2009 | |
| CN | 103887477 A | 6/2014 | |
| CN | 105762342 A | 7/2016 | |
| CN | 107180967 A | 9/2017 | |
| CN | 107834044 A | 3/2018 | |
| CN | 108028371 A | 5/2018 | |
| CN | 109192965 A | 1/2019 | |
| EP | 3783679 A1 | 2/2021 | |
| JP | 08-021388 B | 3/1996 | |
| JP | 09-265976 A | 10/1997 | |
| JP | 2005-251466 A2 | 9/2005 | |
| JP | 2010-111597 A2 | 5/2010 | |
| JP | 2016-189321 A | 11/2016 | |
| JP | 2018-516435 A | 6/2018 | |
| KR | 10-2003-0030818 A | 4/2003 | |
| KR | 20060025515 A | 3/2006 | |
| KR | 10-2012-0022629 A | 3/2012 | |
| KR | 10-2012-0113685 A | 10/2012 | |
| KR | 10-2013-0114097 A | 10/2013 | |
| KR | 10-2014-0031953 A | 3/2014 | |
| KR | 10-2014-0046611 A | 4/2014 | |
| KR | 10-2014-0144590 A | 12/2014 | |
| KR | 10-2014-0148384 A | 12/2014 | |
| KR | 10-1573423 B1 | 12/2015 | |
| KR | 10-2016-0062617 A | 6/2016 | |
| KR | 10-2016-0091981 A | 8/2016 | |
| KR | 10-1681739 B1 | 12/2016 | |
| KR | 10-2017-0077014 A | 7/2017 | |
| KR | 10-2017-0081196 A | 7/2017 | |
| KR | 10-1788232 B1 | 10/2017 | |
| KR | 10-1808373 B1 | 12/2017 | |
| KR | 10-2018-0015841 A | 2/2018 | |
| KR | 10-2018-0102554 A | 9/2018 | |
| KR | 10-2018-0116137 A | 10/2018 | |
| KR | 10-2019-0003940 A | 1/2019 | |
| KR | 10-2019-0010250 A | 1/2019 | |
| KR | 10-2019-0042089 A | 4/2019 | |
| KR | 10-2019-0120725 A | 10/2019 | |
| WO | 2001/029912 A1 | 4/2001 | |
| WO | WO2015080302 A1 | 6/2015 | |
| WO | 2018025036 A1 | 2/2018 | |
| WO | WO2019031766 A2 | 2/2019 | |
| WO | WO2019188358 A1 | 10/2019 | |

OTHER PUBLICATIONS

International Search Report for International Application No. PCT/KR2020/014078 mailed Feb. 25, 2021, 3 pages.

Orita et al., "Application of sulfonium-, thiophenium-, and thioxonium-based salts as electric double-layer capacitor electrolytes", Journal of Power Sources, vol. 195, No. 19, pp. 6970-6976 (2010).

Taniki et al., "Effects of HF content in the (FH)n F-anion on the formation of ionic plastic crystal phases of N-ethyl-N-methylpyrrolidinium and N, N-dimethylpyrrolidinium fluorohydrogenate salts", Physical Chemistry Chemical Physics, vol. 16, No. 4, pp. 1522-1528 (2014).

U.S. Appl. No. 17/659,369 (English translation of originally-filed application papers), application filed Apr. 15, 2022 (78 pages).

U.S. Appl. No. 17/659,371 (English translation of originally-filed application papers), application filed Apr. 15, 2022 (101 pages).

U.S. Appl. No. 17/659,374 (English translation of originally-filed application papers), application filed Apr. 15, 2022 (110 pages).

Written Opinion of the International Searching Authority for International Application No. PCT/KR2020/014078 mailed Feb. 25, 2021, 5 pages.

Liu et al., "Unique 3D nanoporous/macroporous structure Cu current collector for dendrite-free lithium deposition", Energy Storage Materials, vol. 17, pp. 253-259 (Feb. 2019).

U.S. Appl. No. 17/659,369, Notice of Allowance dated May 21, 2025 (9 pages).

Mei et al., "Triple carbon coated LiFePO4 composite with hierarchical conductive architecture as high-performance cathode for Li-ion batteries", Electrochimica Acta 153, pp. 523-530 (2015).

Zhou et al., "Graphene modified LiFePO4 cathode materials for high power lithium ion batteries", J. Mater. Chem., 21, pp. 3353-3358 (2011).

Notice of Allowance, U.S. Appl. No. 17/659,371, dated Dec. 30, 2025 (7 pages).

\* cited by examiner

【Fig. 1】
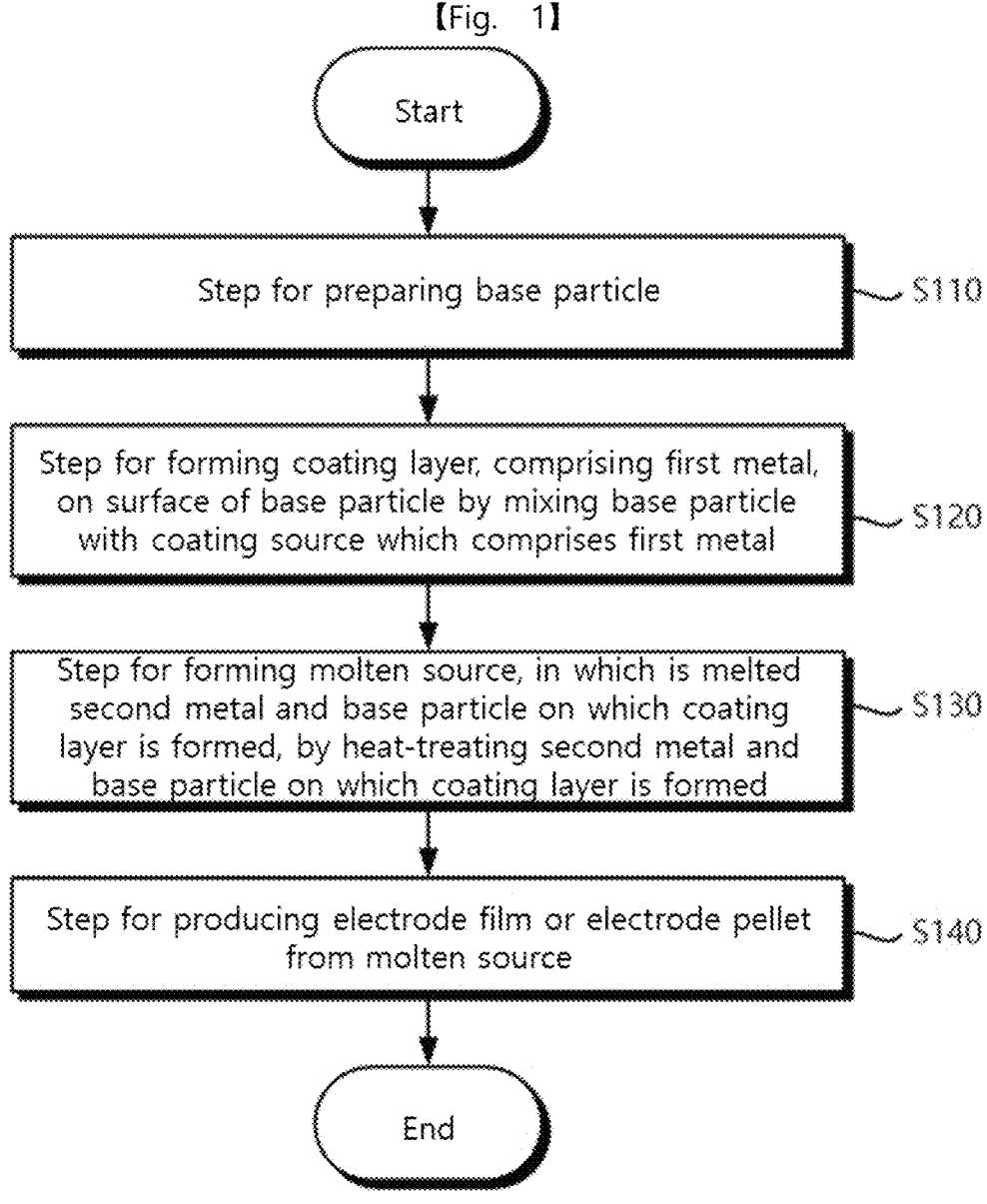

【Fig. 2】
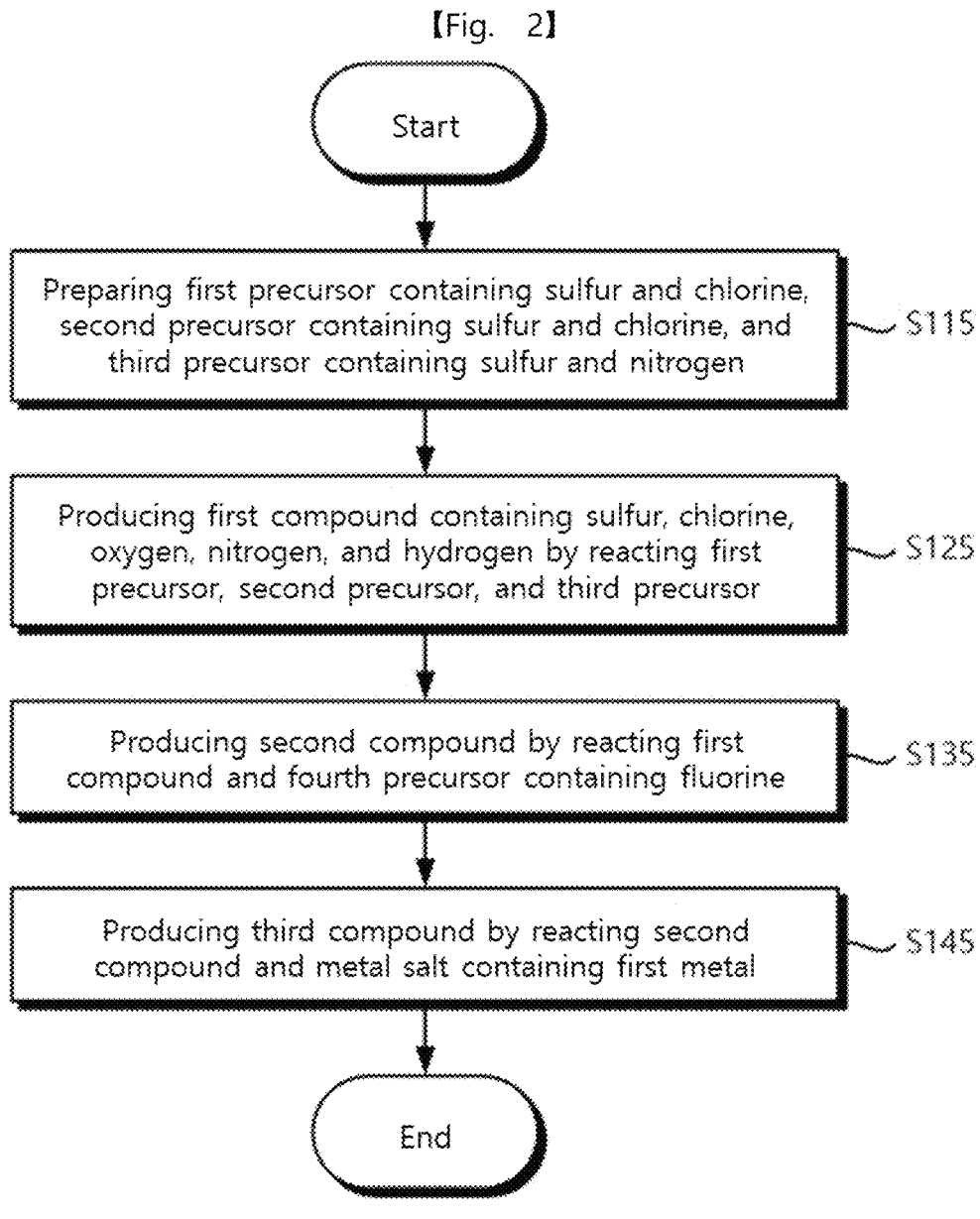

【Fig. 3】
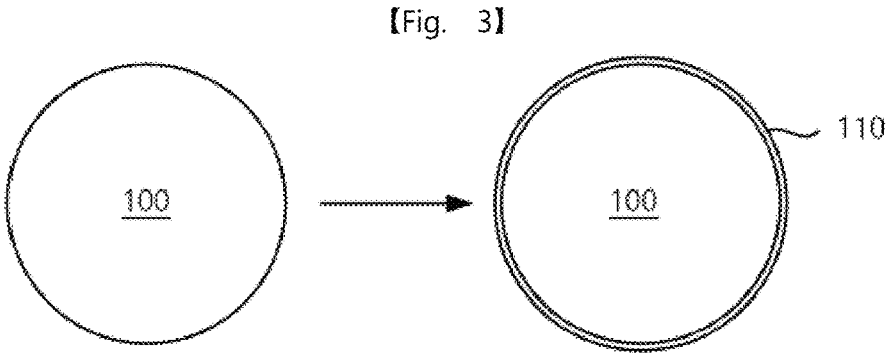
【Fig. 4】
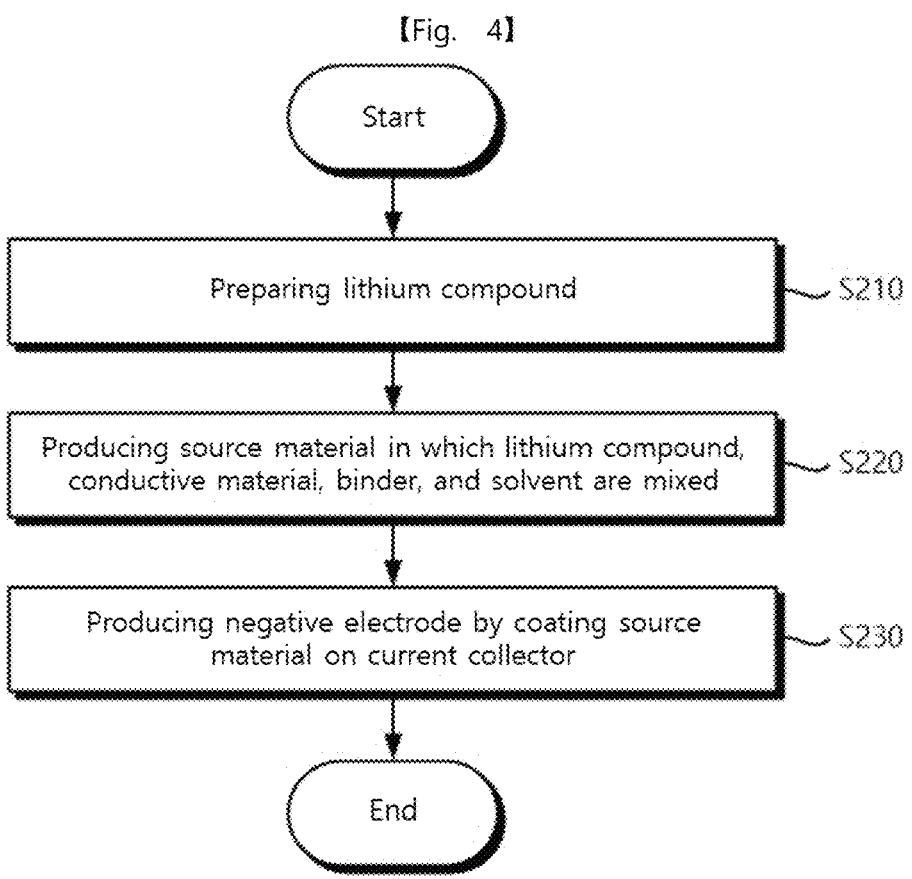

【Fig. 5】

```
        ┌──────────────┐
        │    Start     │
        └──────┬───────┘
               │
               ▼
┌──────────────────────────────────┐
│       Preparing silicon oxide      │ ～ S310
└──────────────┬─────────────────────┘
               │
               ▼
┌──────────────────────────────────┐
│ Producing intermediate compound by │ ～ S320
│  mixing and reacting silicon oxide │
│          and first metal           │
└──────────────┬─────────────────────┘
               │
               ▼
┌──────────────────────────────────┐
│ Producing electrode powder         │
│ containing at least silicon        │ ～ S330
│ among silicon and first metal from │
│ intermediate compound by providing │
│ cleaning solution to               │
│ intermediate compound              │
└──────────────┬─────────────────────┘
               │
               ▼
        ┌──────────────┐
        │     End      │
        └──────────────┘
```

【Fig. 6】

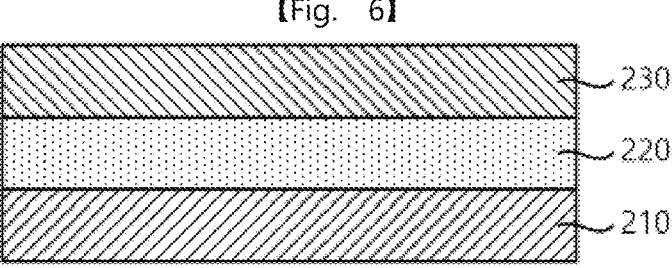

【Fig.  9】
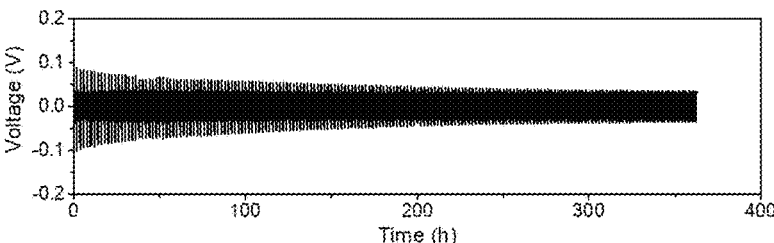
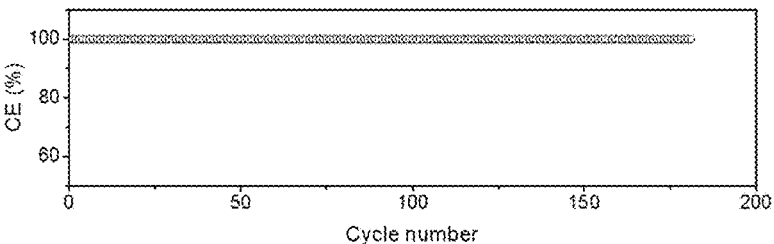
【Fig.  10】
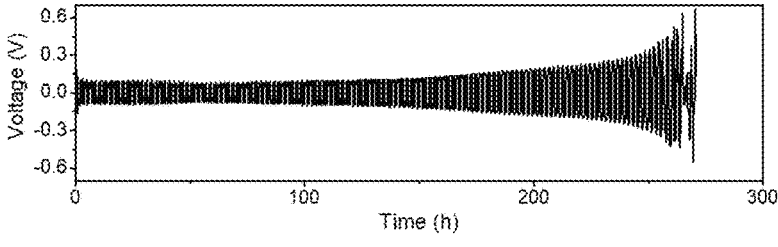
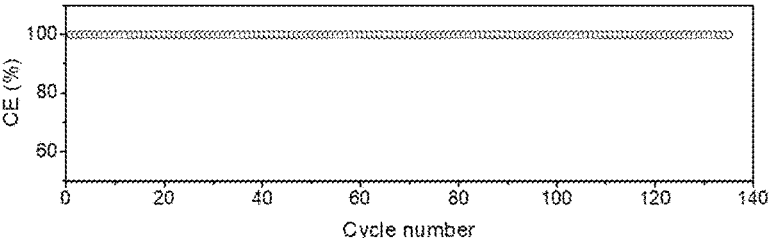

【Fig. 11】
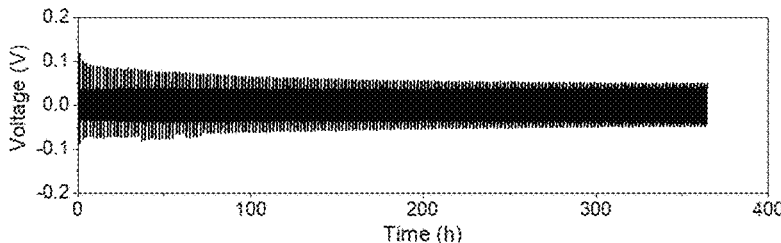
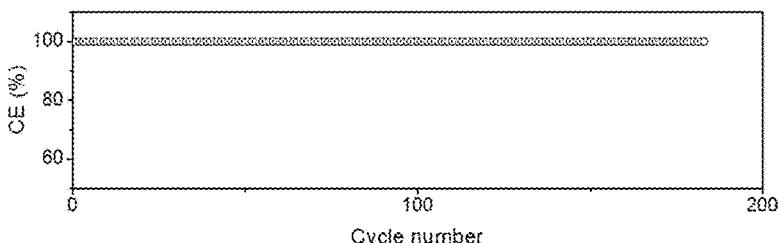
【Fig. 12】
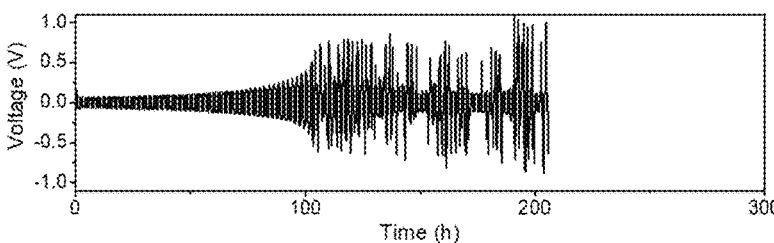
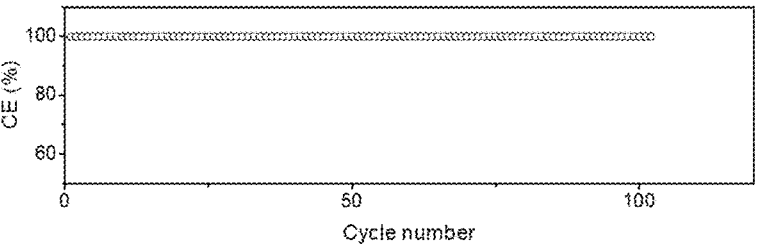

【Fig. 13】
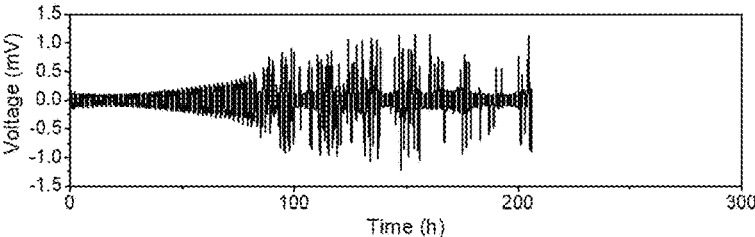
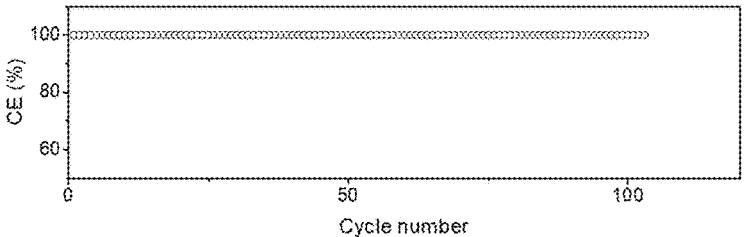
【Fig. 14】
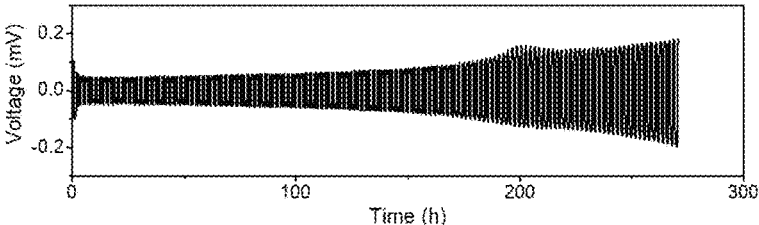
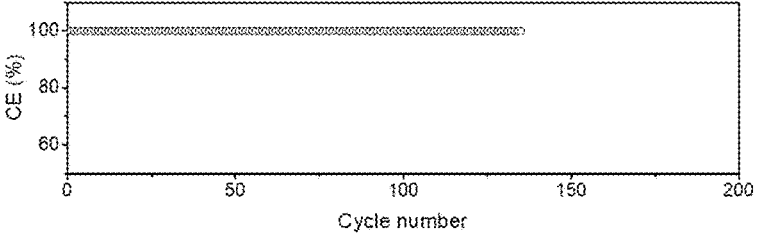

【Fig. 15】
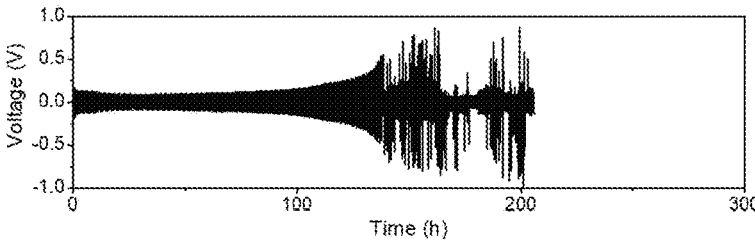
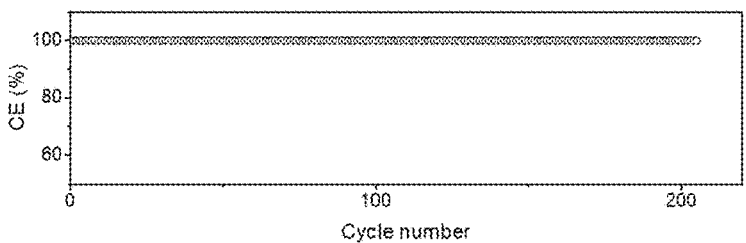
【Fig. 16】
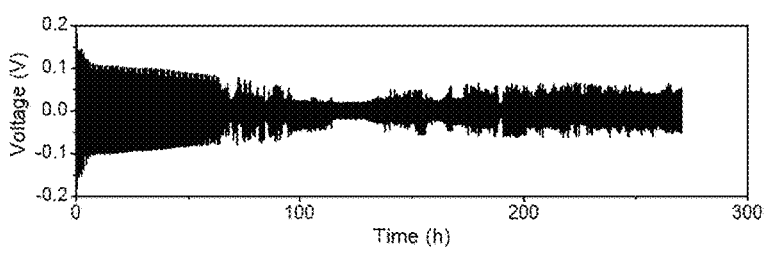
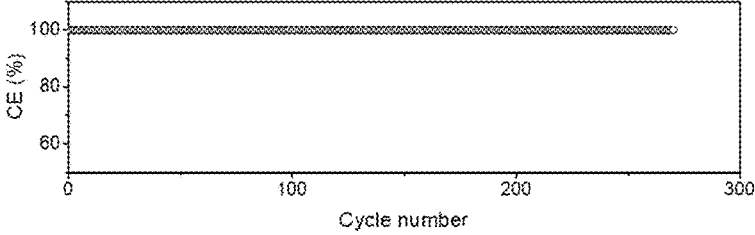

【Fig.   17】
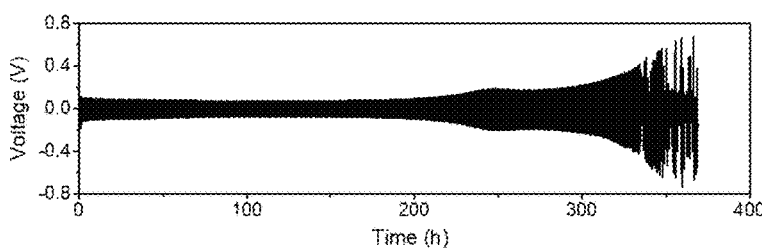
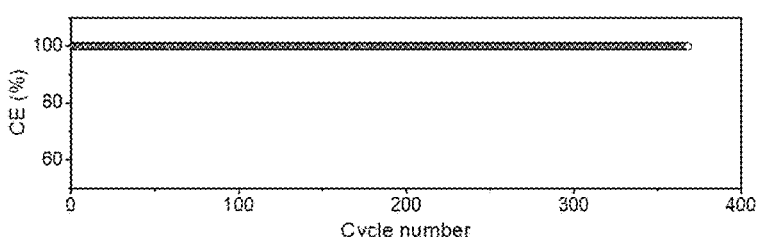
【Fig.   18】
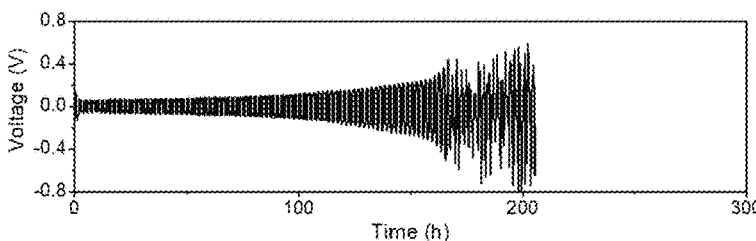
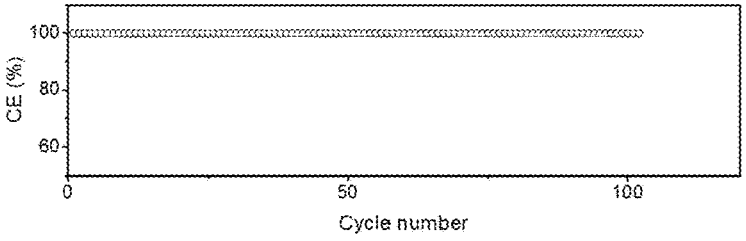

【Fig.  19】
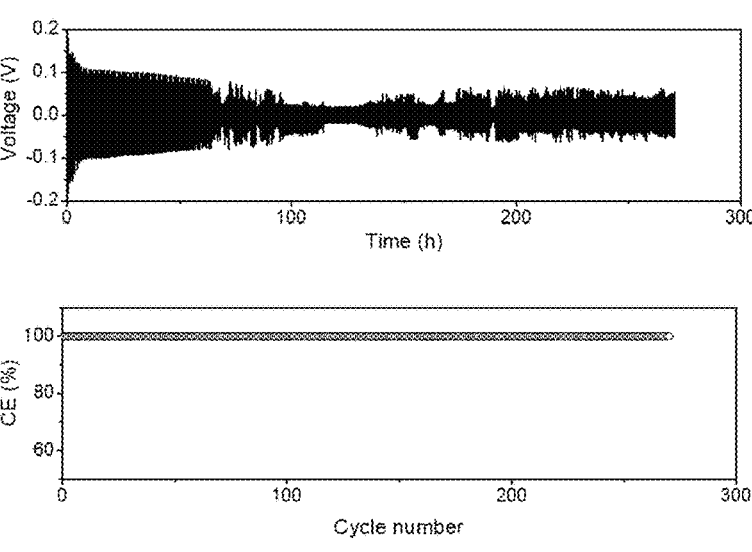
【Fig.  20】
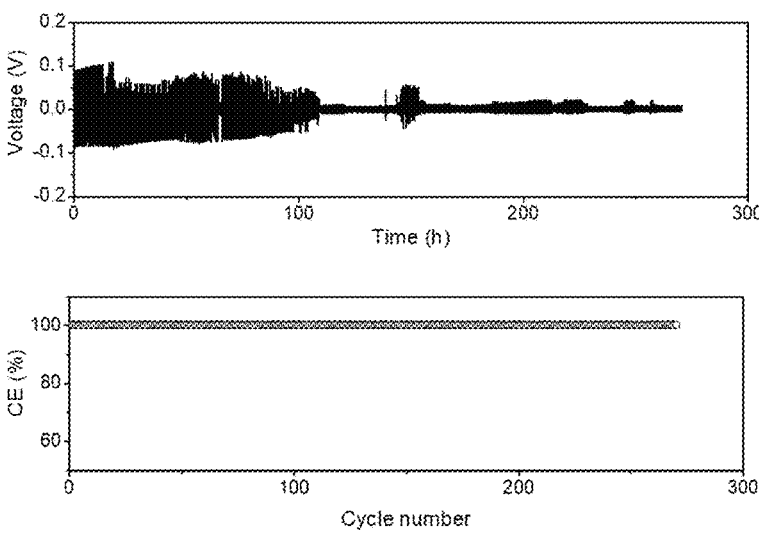

【Fig. 21】
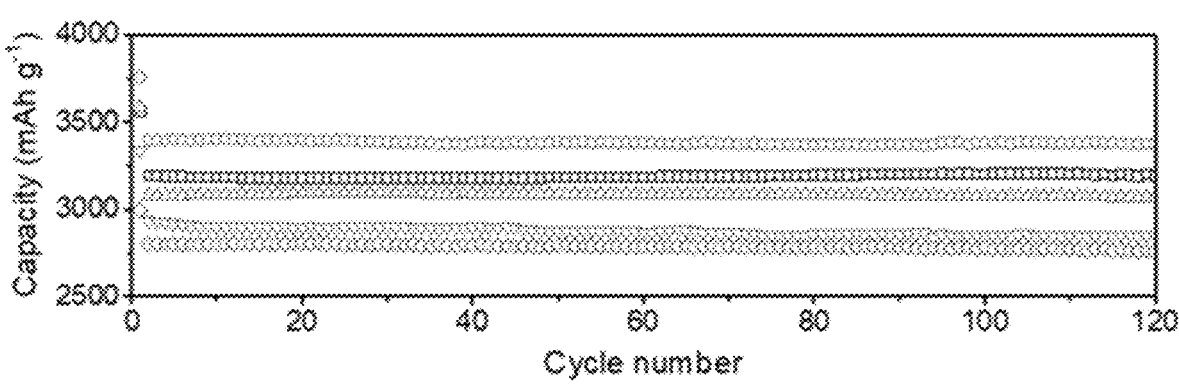
x   Experimental Example 1-1
◇   Experimental Example 1-2
◇   Experimental Example 1-3
△   Experimental Example 1-6
▽   Experimental Example 1-9

【Fig.   22】
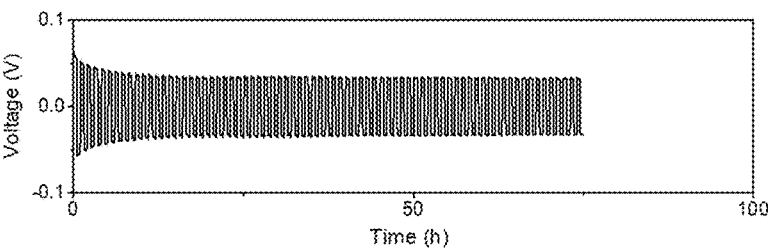
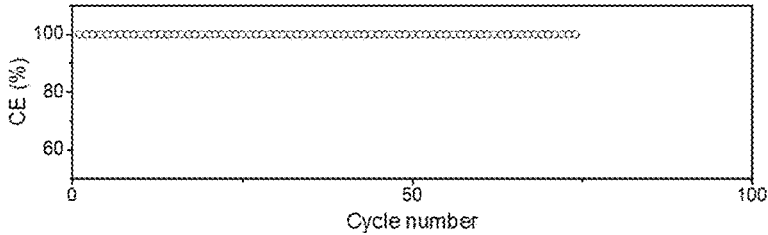
【Fig.   23】
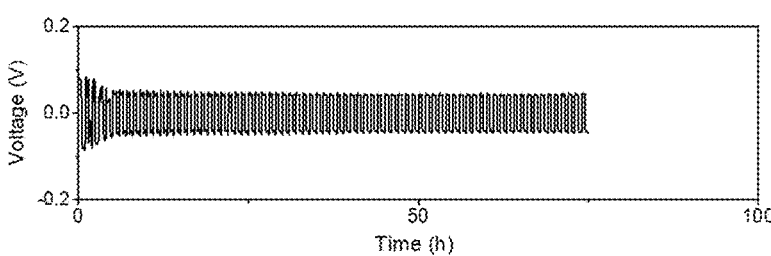
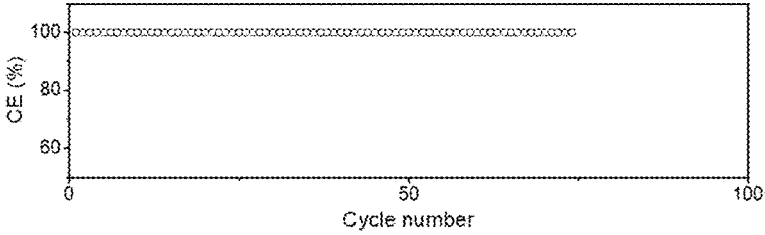

[Fig. 24]
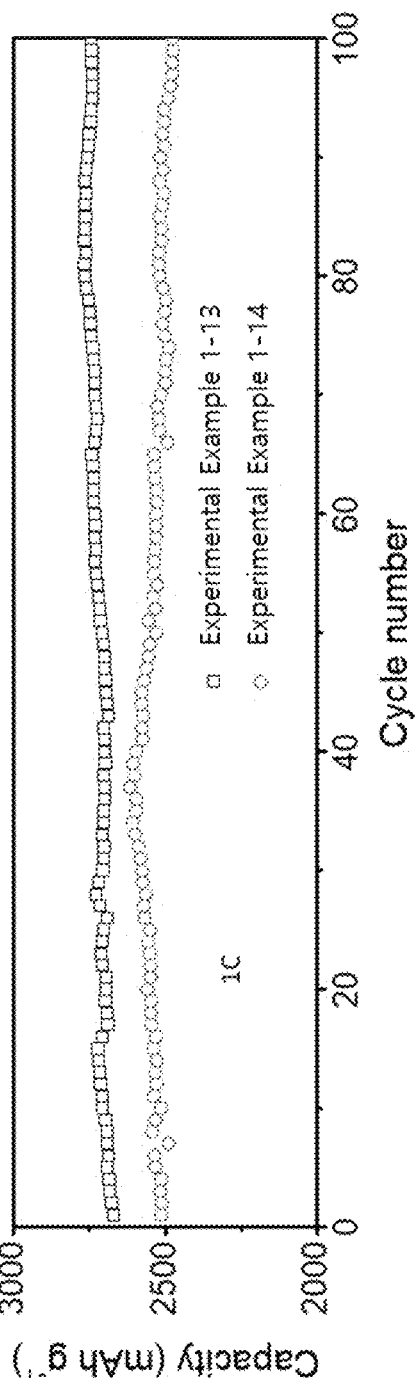

【Fig. 25】
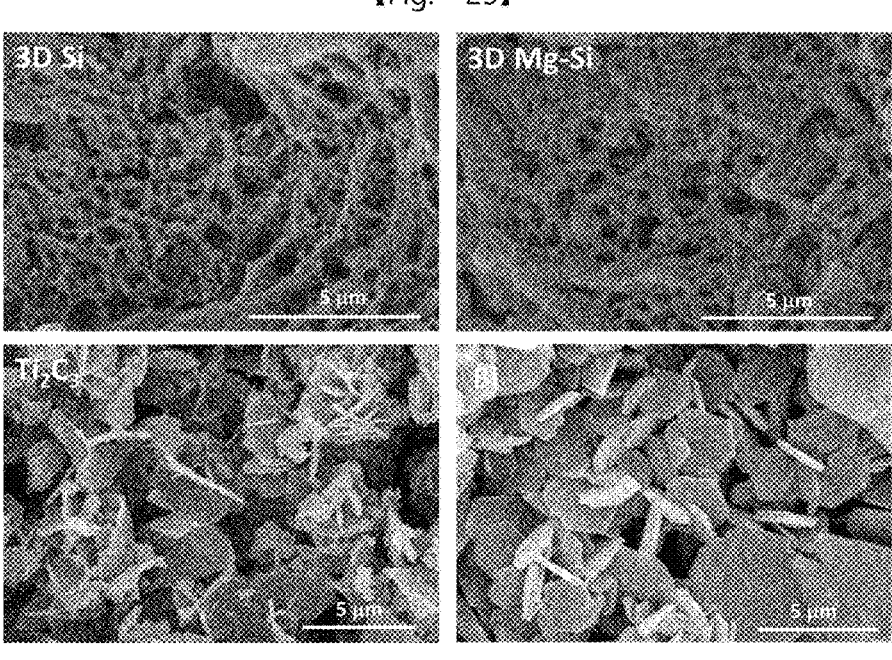
【Fig. 26】
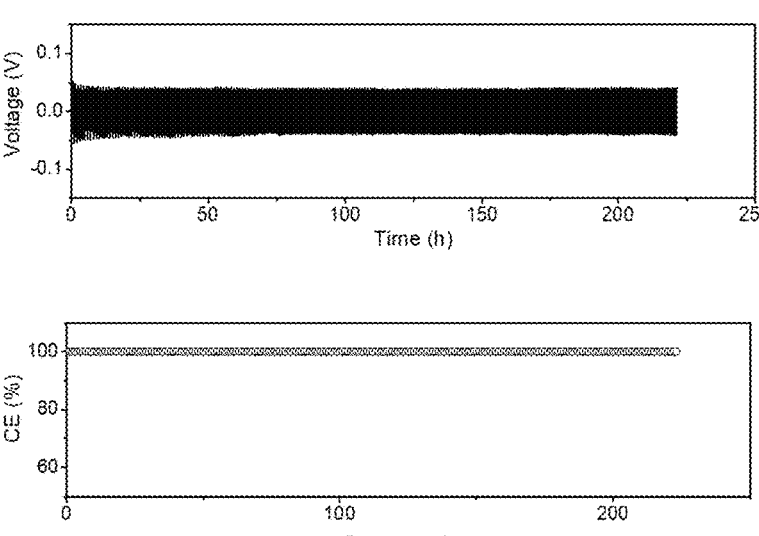

【Fig. 27】
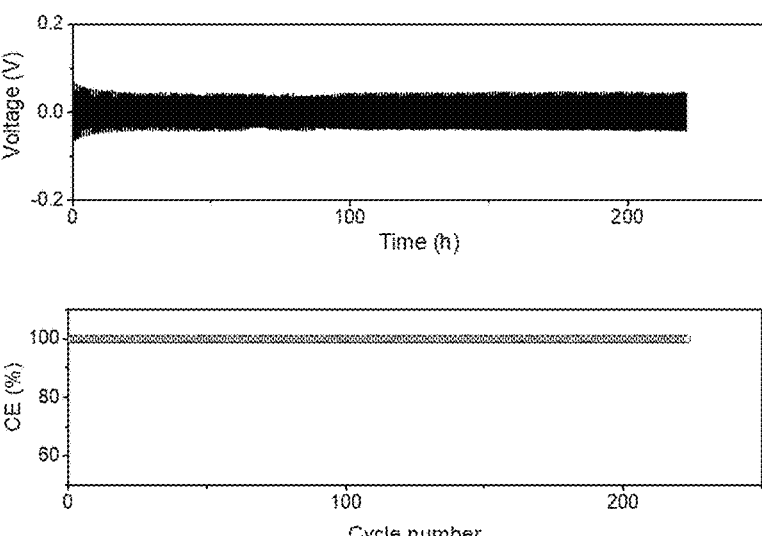
【Fig. 28】
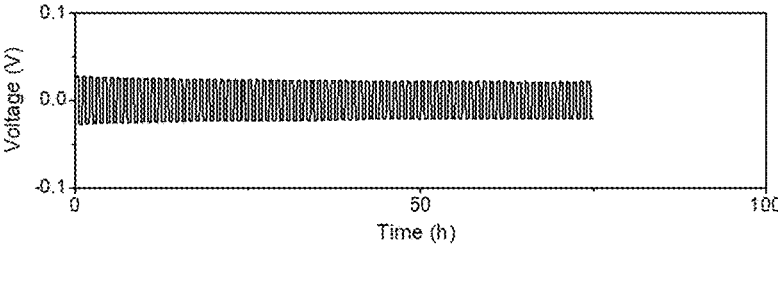
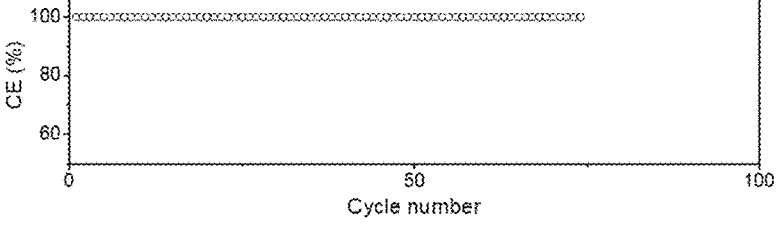

【Fig.   29】
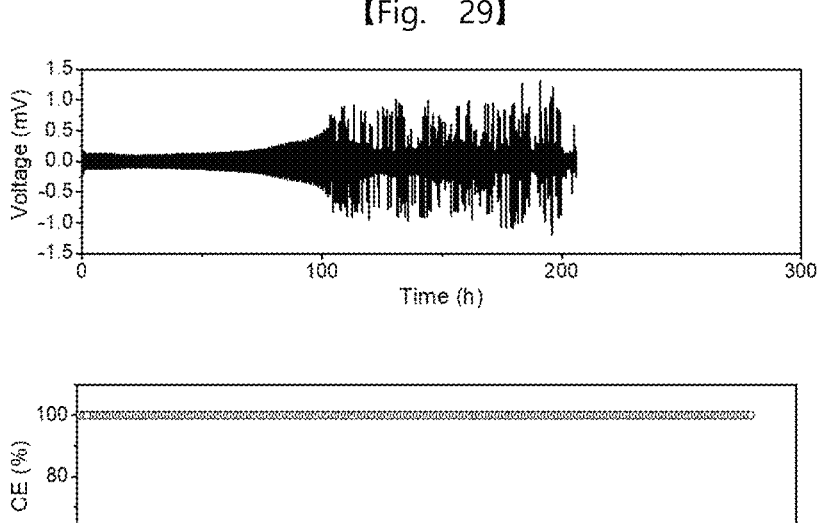

[Fig. 30]
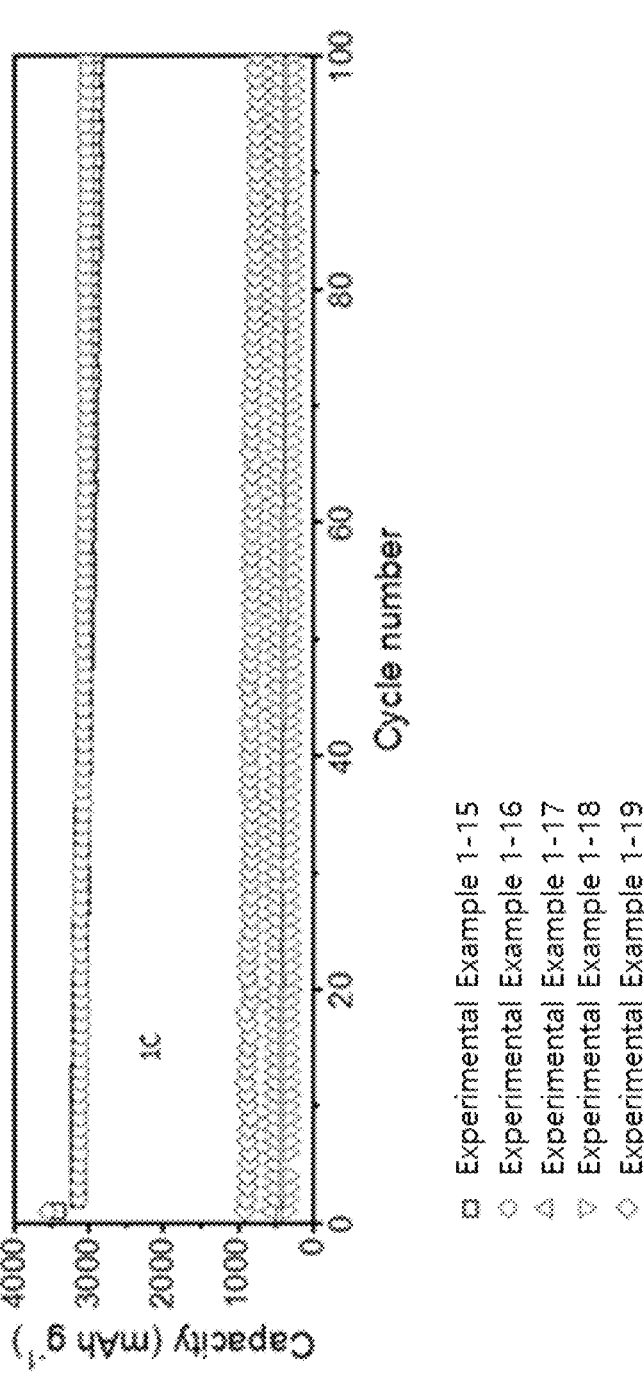

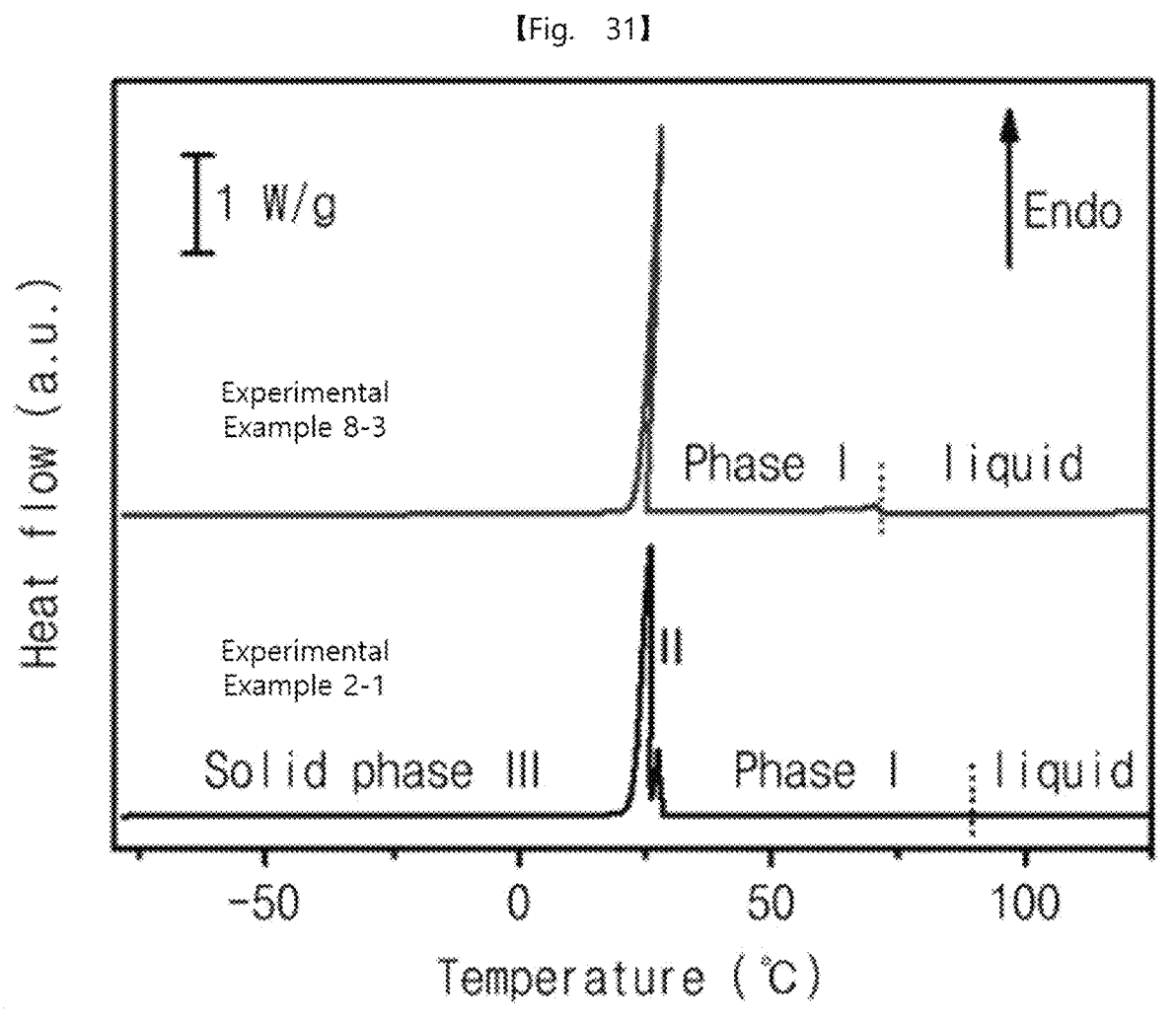

【Fig. 31】

【Fig. 32】
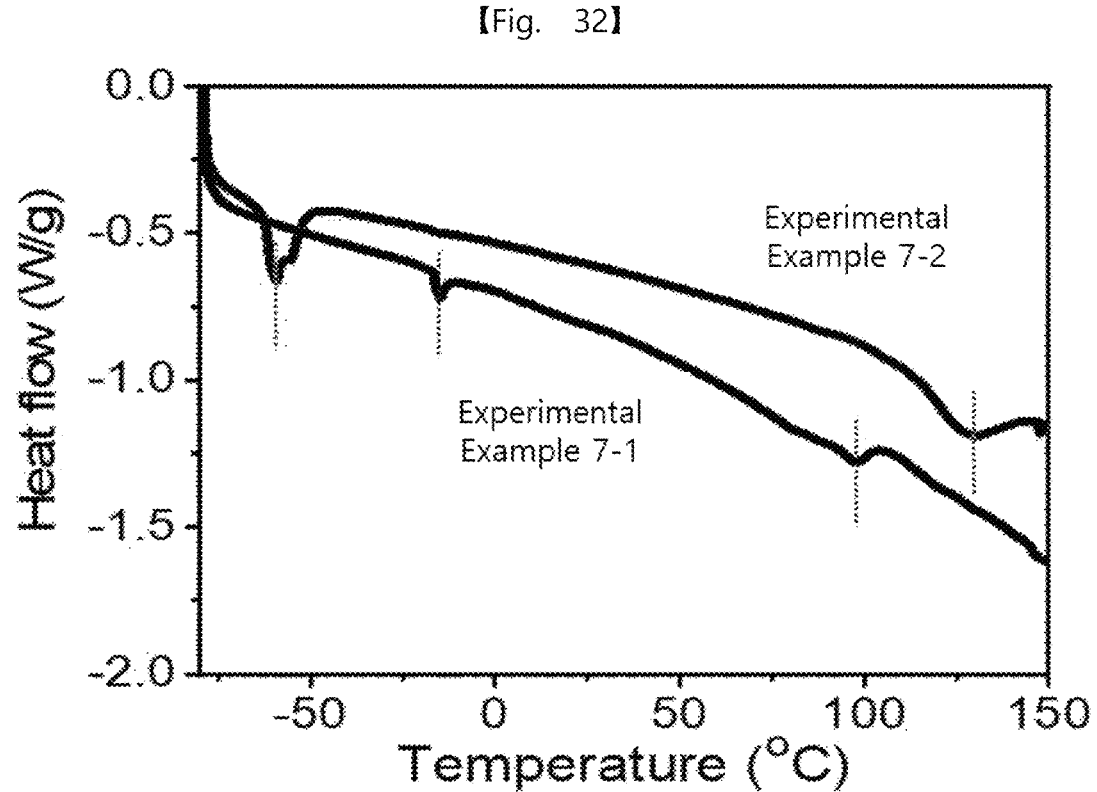

【Fig.  33】
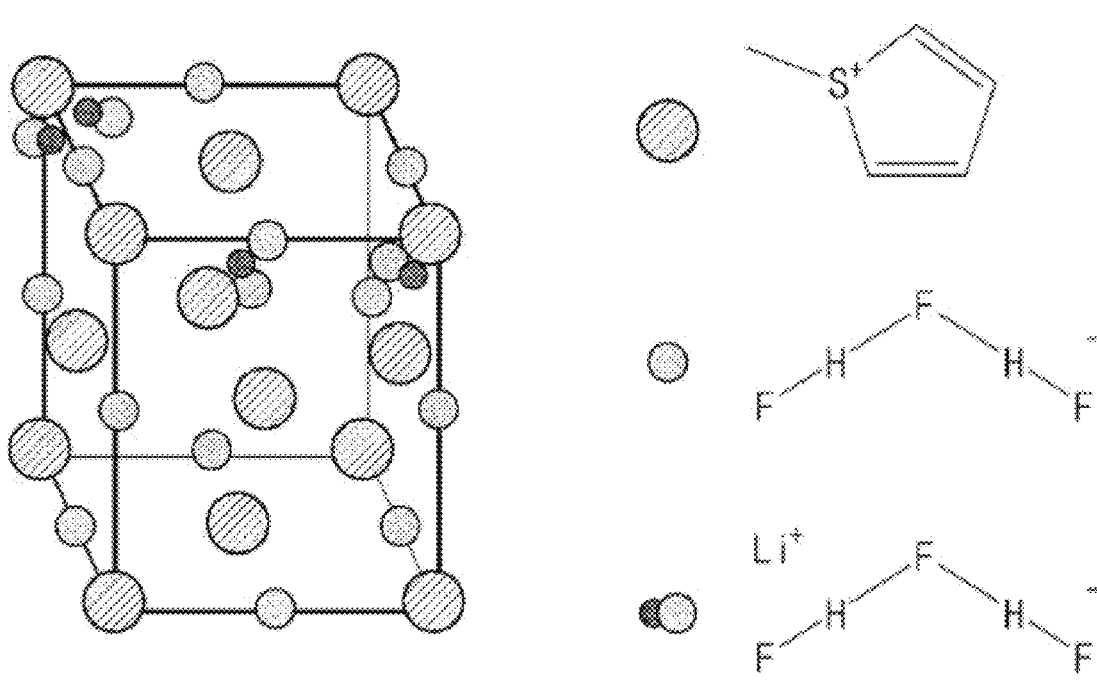
【Fig.  34】
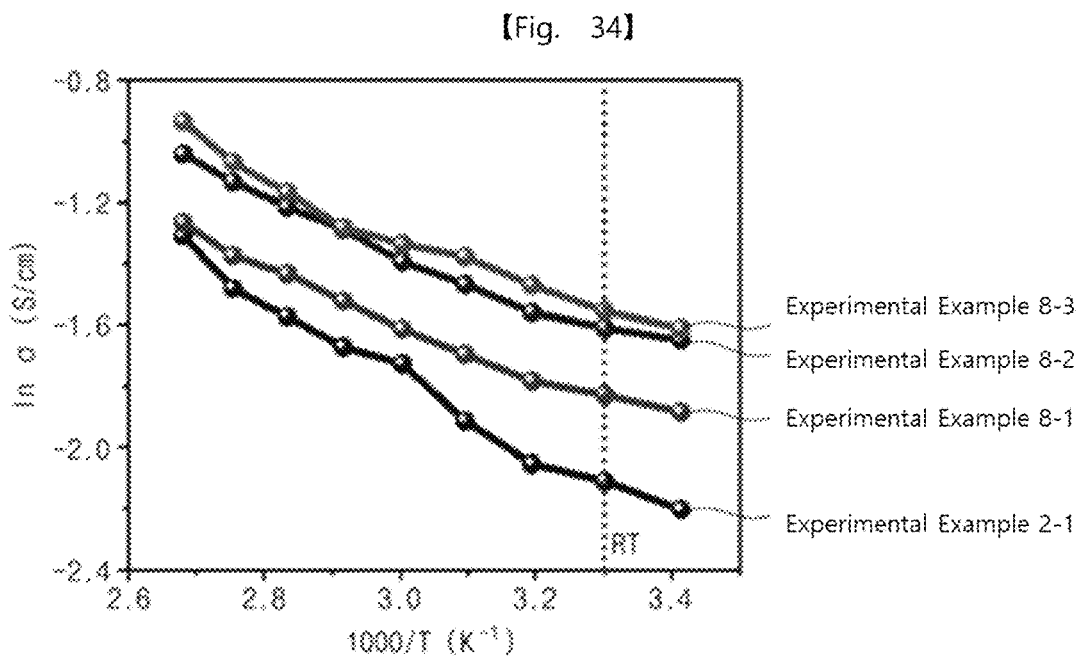

【Fig.  35】
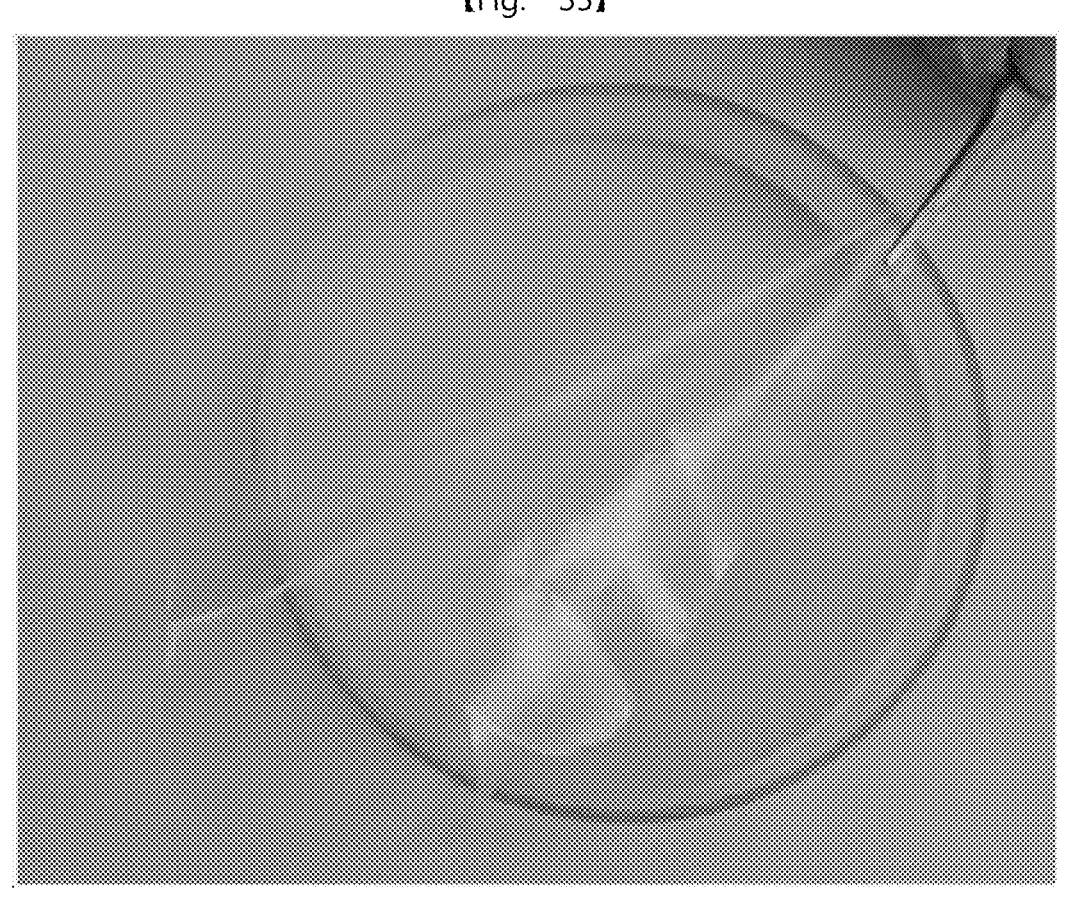

INTERMEDIATE PRODUCT OF ELECTRODE, ELECTRODE POWDER, ELECTRODE USING SAME, ELECTRODE PELLET USING SAME AND METHOD FOR PRODUCING EACH THEREOF

TECHNICAL FIELD

The present application relates to an intermediate product of an electrode, an electrode using the same, an electrode pellet using the same, and a method for producing each thereof, and more particularly, to an intermediate product of an electrode, including a molten source, in which a second metal and a base particle on which a coating layer, including a first metal is formed are melted, an electrode using the same, an electrode pellet using the same, and a method for producing each thereof.

In addition, the present application relates to an electrode powder, an electrode using the same, and a method for producing each thereof, and more particularly, to an electrode powder for a secondary battery, an electrode using the same, and a method for producing each thereof.

BACKGROUND ART

Small IT devices such as smart phones took lead in initial growth of a global secondary battery market, but recently, a secondary battery market for vehicles is rapidly growing with the growth of an electric vehicle market.

Secondary batteries for vehicles are leading the growth of the electric vehicle market while enabling mass production through product standardization and achieving low price and stable performance through technology development, the market is rapidly expanding as a short mileage, which was pointed out as a limitation of electric vehicles, has been resolved by improving battery performance.

With an explosive increase in the demand for secondary batteries, next-generation secondary batteries are also being actively developed to meet the safety issues of secondary batteries and the demand for increased battery capacity.

For example, Korean Patent Registration Publication No. 10-1788232 discloses an electrode for a secondary battery in which an electrode mixture including an electrode active material and a binder is coated on a current collector, and in which the electrode includes: a first electrode mixture layer which contains an electrode active material and a first binder having a glass transition temperature (Tg) lower than that of a second binder and is coated on the current collector; and a second electrode mixture layer which contains an electrode active material and a second binder having a glass transition temperature (Tg) higher than that of the first binder and is coated on the first electrode mixture layer, in which a glass transition temperature (Tg) of the first binder is 15° C. or less; a glass transition temperature (Tg) of the second binder is 10° C. or more in a range higher than the glass transition temperature of the first binder; the glass transition temperature (Tg) of the second binder is 10° C. or more to less than 25° C. in a range higher than the glass transition temperature of the first binder; the electrode for the secondary battery is a negative electrode; and the electrode active material includes a Si-based material.

DISCLOSURE

Technical Problem

One technical object of the present application is to provide an intermediate product of an electrode, an electrode using the same, an electrode pellet using the same, and a method for producing each thereof.

Another technical object of the present application is to provide an intermediate product of an electrode for a secondary battery capable of enhancing charge/discharge efficiency, an electrode using the same, an electrode pellet using the same, and a method for producing each thereof.

Still another technical object of the present application is to provide an intermediate product of an electrode for a secondary battery having high stability and long life, an electrode using the same, an electrode pellet using the same, and a method for producing each thereof.

Still another technical object of the present application is to provide an intermediate product of an electrode for an all-solid-state battery, an electrode using the same, an electrode pellet using the same, and a method for producing each thereof.

Still another technical object of the present application is to provide an electrode powder, an electrode using the same, and a method for producing each thereof.

Still another technical object of the present application is to provide an electrode powder for a secondary battery capable of enhancing charge/discharge efficiency, an electrode using the same, and a method for producing each thereof.

Still another technical object of the present application is to provide an electrode powder for a secondary battery having high stability and long life, an electrode using the same, and a method for producing each thereof.

Still another technical object of the present application is to provide an electrode powder for an all-solid-state battery, an electrode using the same, and a method for producing each thereof.

The technical objects of the present application are not limited to the above.

Technical Solution

To solve the above technical objects, the present application may provide a method for producing an intermediate product of an electrode.

According to one embodiment, the method for producing an intermediate product of an electrode may include: preparing a base particle; forming a coating layer, containing a first metal, on the surface of the base particle by mixing the base particle with a coating source which contains the first metal; and forming a molten source, in which a second metal and the base particle on which the coating layer is formed are melted by heat-treating the second metal and the base particle on which the coating layer is formed.

According to one embodiment, the base particle may include a metal, a metal oxide, a metal carbide, or a carbon structure.

According to one embodiment, the base particle may include a carbon structure, and the method for producing an intermediate product of an electrode may further include pre-treating the base particle with a metal nitric acid solution before mixing the base particle with the coating source.

According to one embodiment, the first metal and the second metal may include lithium.

According to one embodiment, the coating source may include a compound of lithium, nitrogen, fluorine, sulfur, carbon, and oxygen.

According to one embodiment, the base particle and the coating source may be heat-treated at a temperature higher than room temperature after being mixed.

To solve the above technical objects, the present application may provide a method for producing an electrode. According to one embodiment, the method for producing an electrode may include preparing the molten source according to the above-described embodiment, and producing an electrode film by coating with the molten source.

To solve the above technical objects, the present application may provide a method for producing an electrode pellet.

According to one embodiment, the method for producing an electrode pellet may include preparing the molten source according to the above-described embodiment, and producing an electrode pellet by cooling and dividing the molten source.

To solve the above technical objects, the present application may provide a method for producing a coating source.

According to one embodiment, the method for producing a coating source may include: preparing a first precursor containing sulfur and chlorine, a second precursor containing sulfur and chlorine, and a third precursor containing sulfur and nitrogen; producing a first compound containing sulfur, chlorine, oxygen, nitrogen, and hydrogen by reacting the first precursor, the second precursor, and the third precursor; producing a second compound by reacting the first compound and a fourth precursor containing fluorine; and producing a third compound by reacting the second compound and a metal salt containing a first metal.

According to one embodiment, the method for producing a coating source may further include: reacting the second compound with deionized water at a temperature lower than room temperature before reacting the second compound and the metal salt, and the producing of a third compound may include reacting the second compound, reacted with deionized water, with the metal salt.

According to one embodiment, the first metal may include lithium, potassium, sodium, zinc, iron, magnesium, silicon, or aluminum.

To solve the above technical objects, the present application may provide a method for producing an intermediate product of an electrode.

According to one embodiment, the method for producing an intermediate product of an electrode may include: preparing the coating source according to the above-described embodiment; forming a coating layer, containing the first metal, on the surface of the base particle by mixing the base particle with the coating source; and forming a molten source, in which a second metal and the base particle on which the coating layer is formed are melted by heat-treating the second metal and the base particle on which the coating layer is formed.

To solve the above technical objects, the present application may provide an electrode film or an electrode pellet.

According to one embodiment, the electrode film or the electrode pellet may include one in which a molten source, in which a base particle and a coating layer provided on a surface of the base particle and containing a first metal are melted with a second metal, is coagulated.

According to one embodiment, the base particle may include at least any one of silicon oxide, aluminum, aluminum oxide, copper, copper oxide, titanium, titanium oxide, titanium carbide, magnesium, tin, tin oxide, germanium, bismuth, molybdenum, or carbon structure.

To solve the above technical objects, the present application may provide a negative electrode.

According to one embodiment, the negative electrode may include a current collector and a negative electrode active material layer provided on the current collector, in which the negative electrode active material layer may include a lithium compound containing lithium and an anion bonded with the lithium, a conductive material having conductivity higher than that of the lithium compound, and a binder.

According to one embodiment, a ratio of the lithium compound, the conductive material, and the binder may be 6:2:2 to 8:1:1 wt % in the negative electrode active material layer.

According to one embodiment, the anion may include at least any one of $NO_3^-$, $Cl^-$, $Br^-$, $FSI^-$, $F^-$, or $I^-$.

To solve the above technical objects, the present application may provide a method for producing an electrode powder.

According to one embodiment, the method for producing an electrode powder may include: preparing a silicon oxide; producing an intermediate compound by mixing and reacting the silicon oxide and a first metal; and producing an electrode powder containing at least the silicon among silicon and the first metal from the intermediate compound by providing a cleaning solution to the intermediate compound, in which a ratio of the first metal in the electrode powder is controlled depending on a molar concentration of the cleaning solution.

According to one embodiment, the ratio of the first metal in the electrode powder may decrease, as a molar concentration of the cleaning solution increases.

According to one embodiment, when the molar concentration of the cleaning solution is higher than a reference concentration, the electrode powder may not include the first metal, but include the silicon. When the molar concentration of the cleaning solution is lower than the reference concentration, the electrode powder may include an alloy powder of the silicon and the first metal.

According to one embodiment, the electrode powder may have a three-dimensional structure.

According to one embodiment, the preparing of a silicon oxide may include: preparing biomass containing grains or leaves thereof; heat-treating the biomass; and producing the silicon oxide having a three-dimensional structure by providing an acidic solution to the heat-treated biomass.

According to one embodiment, the silicon oxide and the first metal may be heat-treated in an inert gas atmosphere to form the intermediate compound.

To solve the above technical objects, the present application may provide a negative electrode.

According to one embodiment, the negative electrode may include the electrode powder produced by the production method according to the above-described embodiment, a conductive material having conductivity higher than that of the electrode powder, and a binder.

According to one embodiment, the negative electrode may include silicon which is produced from grains or leaves thereof and has a three-dimensional structure.

According to one embodiment, the negative electrode may further include magnesium alloyed with the silicon to have a three-dimensional structure.

Advantageous Effects

According to an embodiment of the present application, the method for producing an intermediate product of an electrode may include: forming a coating layer, containing a first metal, on the surface of a base particle by mixing the base particle with a coating source which contains the first metal; and producing a molten source, in which a second metal and the base particle on which the coating layer is formed are melted by heat-treating the second metal and the base particle on which the coating layer is formed.

The molten source may be an intermediate product for producing an electrode, in which an electrode film or an electrode pellet may be produced from the molten source. Accordingly, the element included in the base particle, the first metal, and the second metal can have a substantially uniform alloy composition in the molten source, the electrode film, and the electrode pellet, thereby enhancing the charge/discharge properties, lifespan, and stability of a secondary battery including the electrode film.

In addition, according to an embodiment of the present application, a negative electrode active material layer can be formed by coating a coating source including a lithium compound in a powder state on a current collector. Accordingly, a ratio of the lithium compound in the negative electrode including the negative electrode active material layer and the current collector can be easily controlled and the negative electrode can be produced by a simple process. Accordingly, the negative electrode and the production method thereof with a less production cost and an easy mass production can be provided.

In addition, according to an embodiment of the present application, an intermediate compound can be produced by reacting a silicon oxide having a three-dimensional structure and a first metal, and an electrode powder having a three-dimensional structure can be produced by providing a cleansing solution to the intermediate compound. In addition, the silicon oxide having a three-dimensional structure can be produced by using biomass. Accordingly, a process of producing the electrode powder capable of producing an electrode for a secondary battery may be simplified with a less production cost and time.

DESCRIPTION OF DRAWINGS

FIG. 1 is a flowchart for explaining a method of producing an intermediate product of an electrode according to a first embodiment of the present application, and an electrode film and an electrode pellet using the same.

FIG. 2 is a flowchart for explaining a method of producing a coating source used in a process of producing an intermediate product of an electrode according to a first embodiment of the present application.

FIG. 3 is a view for explaining a coating layer and a base particle produced according to a method for producing an intermediate product of an electrode according to a first embodiment of the present application.

FIG. 4 is a flowchart for explaining a method of producing a negative electrode using an electrode powder according to a second embodiment of the present invention.

FIG. 5 is a flowchart for explaining a method of producing a negative electrode using an electrode powder according to a third embodiment of the present application.

FIG. 6 is a view for explaining a secondary battery according to an embodiment of the present application.

FIG. 7 is a view showing an SEM picture of an electrode film according to Experimental Examples 1-1 to 1-6 of the present application.

FIG. 8 is a view showing an SEM picture of an electrode film according to Experimental Examples 1-7 to 1-12 of the present application.

FIGS. 9 to 20 are graphs for explaining charge/discharge properties of a second battery including an electrode film according to Experimental Examples 1-1 to 1-12 of the present application, respectively.

FIG. 21 is a graph for explaining charge/discharge properties of a second battery including an electrode film according to Experimental Examples 1-1 to 1-3, 1-6 and 1-9 of the present application.

FIG. 22 is a graph for explaining charge/discharge properties of a second battery including an electrode according to Experimental Example 1-13 of the present application.

FIG. 23 is a graph for explaining charge/discharge properties of a second battery including an electrode according to Experimental Example 1-14 of the present application.

FIG. 24 is a graph for comparing and explaining charge/discharge properties of a second battery including an electrode according to Experimental Examples 1-13 and 1-14 of the present application.

FIG. 25 is a view showing an SEM picture of an electrode powder according to Experimental Examples 1-15 to 1-18 of the present application.

FIGS. 26 to 29 are graphs for explaining charge/discharge properties of a second battery including an electrode according to Experimental Examples 1-15 to 1-18 of the present application, respectively.

FIG. 30 shows graphs for comparing and explaining charge/discharge properties of a second battery including an electrode according to Experimental Examples 1-15 to 1-19 of the present application.

FIG. 31 is a differential scanning calorimetry (DSC) graph showing a compound according to Experimental Example 2-1 and a solid electrolyte according to Experimental Example 8-3 of the present application.

FIG. 32 is a DSC graph showing a compound according to Experimental Examples 7-1 and 7-2 of the present application.

FIG. 33 is a view for explaining a crystal structure of a solid electrolyte according to Experimental Examples 8-1 to 8-3 of the present application.

FIG. 34 is a graph showing an ion conductivity of a compound according to Experimental Example 2-1 and a solid electrolyte according to Experimental Examples 8-1 to 8-3 of the present application depending on a temperature.

FIG. 35 is a picture of a electrolyte membrane coated with a solid electrolyte according to Experimental Example 8-1 of the present application.

MODE FOR INVENTION

Hereinafter, preferred embodiments of the present application will be described in detail with reference to the accompanying drawings. However, the technical idea of the present application is not limited to the embodiments described herein and may be implemented in other forms. Rather, the embodiments introduced herein are provided to sufficiently deliver the spirit of the present application to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the thicknesses of membrane and areas are exaggerated for efficient description of the technical contents.

Further, in the various embodiments of the present specification, the terms such as first, second, and third are used to describe various elements, but the elements are not limited to the terms. These terms are used only to distinguish one component from another component. Accordingly, an element mentioned as a first element in one embodiment may be mentioned as a second element in another embodiment. The embodiments described and illustrated herein also include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added.

Further, in the following description of the present application, a detailed description of known functions or configurations incorporated herein will be omitted when it may make the subject matter of the present invention unnecessarily unclear.

According to a first embodiment of the present application, an intermediate product of an electrode, an electrode using the same, an electrode pellet using the same, and a method for producing each thereof will be described.

FIG. 1 is a flowchart for explaining a method of producing an intermediate product of an electrode according to a first embodiment of the present application, and an electrode film and an electrode pellet using the same, FIG. 2 is a flowchart for explaining a method of producing a coating source used in a process of producing an intermediate product of an electrode according to a first embodiment of the present application, and FIG. 3 is a view for explaining a coating layer and a base particle produced according to a method for producing an intermediate product of an electrode according to a first embodiment of the present application.

Referring to FIGS. 1 and 3, a base particle 100 may be prepared (S110).

The base particle 100 may include a metal, a metal oxide, a metal carbide, or a carbon structure. For example, the base particle 100 may include at least any one of silicon oxide, aluminum, aluminum oxide, copper, copper oxide, titanium, titanium oxide, titanium carbide, magnesium, tin, tin oxide, germanium, bismuth, or molybdenum. For example, the carbon structure may be carbon fiber, carbon fabric, carbon fiber paper, graphene, CNT, etc.

According to one embodiment, the base particle 100 may be provided in a powder state. The base particle 100 may be purified in a vacuum state of 60° C.

When the base particle 100 includes the carbon structure, the base particle 100 may be pretreated with a metal nitric acid solution. For example, the base particle 100 may be pretreated with a zinc nitrate solution or a copper nitrate solution. Accordingly, the carbon structure may be easily coated by a coating source to be described later, and a coating layer may be easily formed on the surface of the carbon structure. Unlike an embodiment of the present application, when the carbon structure is not pretreated with the metal nitric acid solution, the carbon structure may not be easily coated with the coating source to be described later, and thus the coating layer may not be formed.

Besides, referring to FIGS. 1 and 3, a coating layer 110 including a first metal may be formed on the surface of the base particle 100 by mixing the base particle 100 with a coating source which contains the first metal (S120).

Specifically, the coating layer 110 may be formed on the surface of the base particle 100 by mixing and heat-treating the base particle 100 and the coating source. For example, the base particle 100 and the coating source may be heat-treated at 200° C. to 300° C. for 5 to 15 minutes.

The coating source may include a compound of lithium, nitrogen, fluorine, sulfur, carbon, and oxygen. For example, the coating source may be represented by the following <Formula 1>.

<Formula 1>

$$F-\overset{\overset{\displaystyle O}{\|}}{\underset{\underset{\displaystyle O}{\|}}{S}}-\underset{\displaystyle Li}{N}-\overset{\overset{\displaystyle O}{\|}}{\underset{\underset{\displaystyle O}{\|}}{S}}-F$$

A method for producing the coating source will be described with reference to FIG. 2.

The producing of the coating source may include: preparing a first precursor containing sulfur and chlorine, a second precursor containing sulfur and chlorine, and a third precursor containing sulfur and nitrogen (S115); producing a first compound by reacting the first precursor, the second precursor, and the third precursor (S125); producing a second compound by reacting the first compound and a fourth precursor containing fluorine (S135); and producing a third compound (the coating source) by reacting the second compound and a metal salt containing the first metal (S145).

For example, the first precursor may include thionyl chloride, the second precursor may include chlorosulfonic acid, and the third precursor may include sulfamic acid. The first precursor, the second precursor, and the third precursor may be mixed and heat-treated in an inert gas atmosphere (e.g., 150° C.) to produce the first compound. The first compound may include sulfur, chlorine, oxygen, nitrogen, and hydrogen. Specifically, the first compound may be represented by the following <Formula 2>.

<Formula 2>

$$\begin{array}{c} O\underset{\diagdown}{\quad}\overset{\diagup}{\quad}O \\ S \\ Cl\diagup\quad\diagdown NH \\ | \\ \underset{\displaystyle \underset{\|}{\underset{\displaystyle O}{}}}{S} \\ Cl\diagup \end{array}$$

The fourth precursor containing fluorine may include bismuth trifluoride. The second compound may be produced by distilling the first compound and the fourth precursor under reduced pressure while being stirred. The second compound may be represented by the following <Formula 3>.

<Formula 3>

$$F-\overset{\overset{\displaystyle O}{\|}}{\underset{\underset{\displaystyle O}{\|}}{S}}-N^{-}-\overset{\overset{\displaystyle O}{\|}}{\underset{\underset{\displaystyle O}{\|}}{S}}-F$$

For example, the first metal may be lithium, and the metal salt containing the first metal may include lithium carbonate. Alternatively, as another example, the first metal may include potassium, sodium, zinc, iron, magnesium, silicon, or aluminum, and the metal salt may include a carbonate of the first metal.

Before reacting the second compound and the metal salt, the second compound and deionized water may be reacted at a temperature lower than room temperature (e.g., −70° C.). The second compound may be easily vaporized at room temperature and converted into a toxic gas, and a reaction between the second compound and the metal salt may be an exothermic reaction. Accordingly, as described above, the second compound and the metal salt may be reacted in a liquid state at a temperature lower than room temperature, thereby enhancing the safety and reaction efficiency of the reaction between the second compound and the metal salt.

After that, the metal salt may be dripped and reacted in the second compound reacted with deionized water until pH becomes neutral, and then filtrated, washed and dried to produce the third compound (the coating source).

As described above, according to an embodiment of the present application, the first compound may be produced by reacting the first precursor, the second precursor, and the third precursor, the second compound may be produced by reacting the first compound with the fourth precursor, and then the coating source may be produced by reacting the second compound with the metal salt. Accordingly, the coating source may be produced in high yield with a low cost and a simple process, thereby saving the production cost of an intermediate product of an electrode, an electrode film, and an electrode pellet to be described later by using the coating source, and simplifying a production process.

Besides, referring to FIGS. 1 to 3, the second metal and the base particle 100, on which the coating layer 110 is formed, may be heat-treated to produce an intermediate product of an electrode including a molten source, in which the second metal and the base particle 100 on which the coating layer is formed are melted.

The second metal may be provided in the form of a foil. In other words, the base particle 100 in a powder state, on which the coating layer 110 is formed, and the second metal in a foil state may be mixed with each other and heat-treated to produce the molten source. For example, the base particle 100, on which the coating layer 110 is formed, and the second metal may be heat-treated at 250° C. to 350° C. for 5 to 10 minutes and melted.

According to one embodiment, the base particle 100, on which the coating layer 110 is formed, may be provided in a container and heat-treated, after which the second metal may be provided in the heat-treated container.

According to one embodiment, the first metal and the second metal included in the coating layer 110 may be metals of the same element. For example, the first metal and the second metal may be lithium. In other words, the coating layer 110 containing lithium may be formed on the surface of the base particle 100 through the coating source containing lithium, thereby enhancing the lithiophilic property of the base particle 100. For this reason, the base particle 100 with enhanced lithiophilic property may easily react with lithium, which is the second metal, thereby producing the molten source in which the base particle 100 and lithium are melted.

If the coating layer 110 is not formed on the surface of the base particle 100, the base particle 100 and the second metal may not easily react, and thus the molten source may not have a uniform composition.

An electrode film may be produced from the molten source. Specifically, the electrode film may be produced by coating the molten source on a current collector. For example, the molten source may be coated through a doctor blade method.

In addition, an electrode pellet may be produced from the molten source. Specifically, the electrode pellet may be produced by cooling the molten source and dividing the cooled molten source. The electrode pellet may be distributed, stored, and delivered as it is, and the electrode pellet may be melted to produce the electrode film by a manufacturer of a secondary battery and/or an electrode of the secondary battery.

According to an embodiment of the present application, the coating layer 110, containing the first metal, on the surface of the base particle 100 may be formed by mixing the base particle 100 with the coating source which contains the first metal; and the molten source, in which the second metal and the base particle 100 on which the coating layer 110 is formed are melted, may be produced by heat-treating the second metal and the base particle 100 on which the coating layer 110 is formed. The molten source may be an intermediate product for producing an electrode, in which the electrode film or the electrode pellet may be produced from the molten source. Accordingly, the element included in the base particle 100, the first metal, and the second metal may have a substantially uniform alloy composition in the molten source, the electrode film, and the electrode pellet, thereby enhancing the charge/discharge properties, lifespan, and stability of a secondary battery including the electrode film.

In the embodiment of the present application described with reference to FIGS. 1 to 3, the third compound (the coating source) was used for coating the base particle 100, but the use of the third compound is not be limited thereto, but may be used as an additive for a secondary battery or an electrolyte for a super capacitor.

Specifically, the third compound may be utilized as a metal salt added in an electrolyte including dimethyl carbonate (DMC), diethyl carbonate (DEC), dipropyl carbonate (DPC), ethyl methyl carbonate (EMC), methyl propyl carbonate (MPC), ethyl propyl carbonate (EPC) or the like.

According to a second embodiment of the present application, an electrode powder, an electrode using the same, and a method for producing each thereof will be described.

FIG. 4 is a flowchart for explaining a method of producing a negative electrode using an electrode powder according to a second embodiment of the present invention.

Referring to FIG. 4, a silicon compound may be prepared (S210).

The lithium compound may include lithium and an anion bonded with the lithium. For example, the anion may include at least any one of $NO_3^-$, $Cl^-$, $Br^-$, $FSI^-$, $F^-$, or $I^-$. Specifically, for example, the lithium compound may include at least any one of $LiNO_3$, $LiCl$, $LiBr$, $LiFSI$, $LiF$, or $LiI$.

According to one embodiment, the lithium compound may be prepared in a powder state.

A source material in which the lithium compound, conductive material, binder, and solvent are mixed may be produced (S220).

The conductive material may have conductivity higher than that of the lithium compound. For example, the conductive material may include carbon black. Alternatively, as another example, the conductive material may include at least any one of Super P, acetylene black, SUPER C65, graphene, or CNT. The binder may attach the conductive material and the lithium compound onto a current collector to be described later. For example, the binder may include poly(vinylidene fluoride) (PVDF). As another example, the binder may include at least any one of carboxymethyl cellulose (CMC), styrene-butadiene rubber (SBR), polytetrafluoroethylene (PTFE), poly(ethylene oxide) powder, or silver paste.

In the solvent, the lithium compound, the conductive material, and the binder may be dispersed and/or dissolved. For example, the solvent may be N-methylpyrrolidone (NMP). As another example, the solvent may include at least any one of N,N-dimethylformamide (DMF), toluene, dimethyl sulfoxide (DMSO), hexane, and tetrahydrofuran (THF).

The source material may be coated on a current collector to produce a negative electrode (S230).

The source material may be coated on the current collector to form a negative electrode active material layer on the current collector, thereby producing the negative electrode including the negative electrode active material and the current collector. For example, the current collector may be a metal foil, and the coating source may be coated on the current collector and heat-treated at 60° C. to form the negative electrode active material layer.

As described above, the negative electrode active material layer may be formed by mixing the lithium compound in a powder state and the conductive material in a powder state together with the binder. Accordingly, when observing the inside and section of the negative electrode active material layer, the lithium compound in a powder state may be observed.

The lithium compound may function as a negative electrode active material that occludes and desorbs lithium during charging and discharging of a secondary battery including the negative electrode.

According to one embodiment, a ratio of the lithium compound, the conductive material, and the binder may be 6:2:2 to 8:1:1 wt % in the solvent. Accordingly, a ratio of the lithium compound, the conductive material, and the binder may be 6:2:2 to 8:1:1 wt % in the negative electrode active material layer. If the ratio of the lithium compound is lower than 60 wt % and the ratio of the conductive material and the binder is higher than 20 wt %, respectively, the charge/discharge properties of the secondary battery including the negative electrode may be deteriorated. In addition, if the ratio of the lithium compound is higher than 80 wt % and the ratio of the conductive material and the binder is lower than 10 wt %, respectively, the lifespan properties may be deteriorated due to a volume expansion of the negative electrode active material layer of the negative electrode in the process of charging and discharging of the secondary battery including the negative electrode.

As described above, however, according to an embodiment of the present application, the ratio of the lithium compound, the conductive material, and the binder may be 6:2:2 to 8:1:1 wt %, thereby enhancing the charge/discharge properties and lifespan properties of the secondary battery including the negative electrode.

According to an embodiment of the present application, the negative electrode active material layer may be formed on the current collector by using the lithium compound in a powder state and the conductive material in a powder state. Accordingly, the ratio of the lithium compound in the negative electrode including the negative electrode active material layer and the current collector may be easily controlled and the negative electrode may be produced by a simple process. Accordingly, the negative electrode and the production method thereof with a less production cost and an easy mass production may be provided.

According to a third embodiment of the present application, an electrode powder, an electrode using the same, and a method for producing each thereof will be described.

FIG. 5 is a flowchart for explaining a method of producing a negative electrode using an electrode powder according to a third embodiment of the present application.

Referring to FIG. 5, a silicon oxide may be prepared (S310).

According to one embodiment, the silicon oxide may have a porous three-dimensional structure, and the silicon oxide may be produced by using biomass. Specifically, for example, the preparing of a silicon oxide may include: preparing biomass containing grains or leaves thereof; heat-treating the biomass; and producing the silicon oxide having a three-dimensional structure by providing an acidic solution to the heat-treated biomass.

For example, the biomass may be rice or leaves thereof and may be heat-treated at 300° C., and the acidic solution may be hydrochloric acid.

An intermediate compound may be produced by mixing and reacting the silicon oxide and a first metal (S320).

The first metal may be provided in a powder state and mixed with the silicon oxide in a powder state. For example, the first metal may include magnesium.

The mixture of the silicon oxide and the first metal may be heat-treated in an inert gas atmosphere. For example, the mixture may be heat-treated in a nitrogen gas atmosphere at 600° C. for three hours. Accordingly, the silicon oxide and the first metal may be reacted with each other to produce the intermediate compound.

A cleaning solution may be provided to the intermediate compound to produce an electrode powder containing at least the silicon among silicon and the first metal from the intermediate compound.

According to one embodiment, the ratio of the first metal in the electrode powder may be controlled depending on a molar concentration of the cleaning solution in the producing of the electrode powder. For example, the cleansing solution may include hydrochloric acid.

Specifically, as the molar concentration of the cleansing solution increases, the removal ratio of the first metal in the intermediate compound may increase, and thus the ratio of the first metal in the electrode powder may decrease. In contrast, as the molar concentration of the cleansing solution decreases, the removal ratio of the first metal in the intermediate compound may decrease, and thus the ratio of the first metal in the electrode powder may increase.

In other words, when the molar concentration of the cleansing solution is higher than a reference concentration, the first metal may be completely removed from the intermediate compound, and thus the electrode powder may be formed with the silicon without including the first metal. Alternatively, when the molar concentration of the cleansing solution is higher than the reference concentration, the first metal may remain in the intermediate compound, and thus the electrode powder may be formed with an alloy of the silicon and the first metal. The reference concentration may be adjusted depending on an amount of the first metal and a time at which the cleaning solution is provided. Specifically, the reference concentration may increase as the amount of the first metal increases and/or the time at which the cleansing solution decreases.

As described above, the silicon oxide may have a three-dimensional structure. Accordingly, the electrode powder produced by using the silicon oxide may also have silicon having a three-dimensional structure. In addition, the silicon of the electrode powder may be activated by the cleaning solution. In other words, the first metal may be removed to form silicon having a three-dimensional structure. Accordingly, the charge/discharge properties of a secondary battery including an electrode produced by using the electrode powder may be enhanced.

The electrode powder may be mixed with the conductive material, the binder, and the solvent as described with reference to FIG. 1, and then coated on a current collector to form an electrode for a secondary battery.

According to an embodiment of the present application, the electrode powder having a three-dimensional structure may be produced through a simple process of producing the intermediate compound by reacting the silicon oxide having a three-dimensional structure and the first metal and providing the cleaning solution to the intermediate compound.

In addition, the silicon oxide having a three-dimensional structure may be produced by using biomass.

Accordingly, the process of producing the electrode powder capable of producing an electrode for a secondary battery may be simplified with a less production cost, thereby facilitating mass production.

The electrode film and the negative electrode produced by the method described above with reference to FIGS. 1 to 5 may be used as an electrode of a secondary battery together with a solid electrolyte. Hereinafter, a secondary battery according to an embodiment of the present application will be described with reference to FIG. 6.

FIG. 6 is a view for explaining a secondary battery according to an embodiment of the present application.

Referring to FIG. 6, the secondary battery according to an embodiment of the present application may include a negative electrode 210, a solid electrolyte 220 and a positive electrode 230.

The negative electrode 210 may include the electrode film produced from the molten source, or the electrode film produced from the electrode pellet, as described with reference to FIGS. 1 to 3. Alternatively, the negative electrode may include the electrode produced from the electrode powder, as described with reference to FIGS. 4 and 5.

For example, the positive electrode 230 may include a lithium oxide containing at least any one of nickel, cobalt, manganese, or aluminum. Alternatively, as another example, the positive electrode 230 may include an oxide of lithium, phosphorus, and iron.

The solid electrolyte 220 may be a compound in which cations and anions are bound.

Specifically, the cation may include at least any one of thiophenium represented by <Formula 4>, thiazolium represented by <Formula 5>, phospholanium represented by <Formula 6>, or oxathiolanium represented by <Formula 7> or <Formula 8>, or thiazolidinium represented by <Formula 9>. In <Formula 4> to <Formula 9>, R1 may be an alkyl group.

<Formula 4>

<Formula 5>

-continued

<Formula 6>

<Formula 7>

<Formula 8>

<Formula 9>

Specifically, the anion may include fluorohydrogenate represented by <Formula 10>.

<Formula 10>

Alternatively, the anion may include cyano(nitroso) methanide or tetrazolidine.

According to another embodiment, the solid electrolyte 220 may be an oxide, sulfide, or polymer-based material, as described above.

Hereinafter, an electrode film produced according to a specific experimental example based on the first embodiment of the present application as described above, and results of evaluating properties will be described accordingly.

PRODUCTION OF COATING SOURCE ACCORDING TO EXPERIMENTAL EXAMPLE

Thionyl chloride as a first precursor, chlorosulfuric acid as a second precursor, and sulfamic acid as a third precursor were prepared. Thionyl chloride, chlorosulfuric acid, and sulfamic acid were mixed and heat-treated at 150° C. for 12 hours.

Bis(chlorosulfonyl)imide was prepared as a first compound by removing and distilling the gas generated from a caustic soda solution to remove an excess solvent. Bismuth trifluoride was prepared as a fourth precursor, reacted with bis(chlorosulfonyl)imide in a glove box while being stirred for eight hours, and distilled under reduced pressure to produce bis(fluorosulfonyl)imide as a second compound.

After that, the second compound was reacted with deionized water at −70° C. and heated to room temperature, and lithium carbonate was slowly added to make the pH neutral. Then, the resulting solution was filtered, washed with ethyl acetate, and dried to produce a coating source according to the experimental example represented by <Formula 1> described above.

Production of Electrode Film According to Experimental Example 1-1

Silicon oxide was prepared as a base particle. Silicon oxide ($SiO_2$) was pretreated in a vacuum at 60° C.

A coating source produced according to the above-described experimental example was prepared, and the silicon oxide and the coating source were mixed and heat-treated at 250° C. for 10 minutes to form a coating layer on the surface of the silicon oxide.

After that, the silicon oxide with the coating layer formed was placed in a stainless steel container and heat-treated at 300° C., and lithium was added and reacted to produce a molten source.

An electrode film according to Experimental Example 1-1 including a Li—SiO$_2$ alloy was produced by coating the molten source on a substrate through a doctor blade method.

Production of Electrode Film According to
Experimental Example 1-2

An electrode film according to Experimental Example 1-2 including a Li—TiO$_2$ alloy was produced by the same method as in Experimental Example 1-1, except for using titanium oxide (TiO$_2$) as a base particle.

Production of Electrode Film According to
Experimental Example 1-3

An electrode film according to Experimental Example 1-3 including a Li—Mg—Si alloy was produced by the same method as in Experimental Example 1-1, except for using Magnesium-silicon (Mg—Si) as a base particle.

Production of Electrode Film According to
Experimental Example 1-4

An electrode film according to Experimental Example 1-4 including a Li—Bi alloy was produced by the same method as in Experimental Example 1-1, except for using bismuth (Bi) as a base particle.

Production of Electrode Film According to
Experimental Example 1-5

An electrode film according to Experimental Example 1-5 including a Li—Ge alloy was produced by the same method as in Experimental Example 1-1, except for using germanium (Ge) as a base particle.

Production of Electrode Film According to
Experimental Example 1-6

An electrode film according to Experimental Example 1-6 including a Li—Ti$_3$C$_2$ alloy was produced by the same method as in Experimental Example 1-1, except for using titanium carbide (Ti$_3$C$_2$) as a base particle.

Production of Electrode Film According to
Experimental Example 1-7

An electrode film according to Experimental Example 1-7 including a Li—Sn—SnO$_2$ alloy was produced by the same method as in Experimental Example 1-1, except for using tin and tin oxide (Sn and SnO$_2$) as a base particle.

Production of Electrode Film According to
Experimental Example 1-8

An electrode film according to Experimental Example 1-8 including a Li—Mo alloy was produced by the same method as in Experimental Example 1-1, except for using molybdenum (Mo) as a base particle.

Production of Electrode Film According to
Experimental Example 1-9

An electrode film according to Experimental Example 1-9 including a Li—CuO alloy was produced by the same method as in Experimental Example 1-1, except for using copper oxide (CuO) as a base particle.

Production of Electrode Film According to
Experimental Example 1-10

An electrode film according to Experimental Example 1-10 including a Li—Mg alloy was produced by the same method as in Experimental Example 1-1, except for using magnesium (Mg) as a base particle.

Production of Electrode Film According to
Experimental Example 1-11

An electrode film according to Experimental Example 1-11 including a Li—Al—Al$_2$O$_3$ alloy was produced by the same method as in Experimental Example 1-1, except for using aluminum and aluminum oxide (Al and Al$_2$O$_3$) as a base particle.

Production of Electrode Film According to
Experimental Example 1-12

An electrode film according to Experimental Example 1-12 including a Li-graphene alloy was produced by the same method as in Experimental Example 1-1, except for using graphene as a base particle.

The configuration of the electrode film according to Experimental Examples 1-1 to 1-12 may be summarized as shown in <Table 1> below.

TABLE 1

| Classification | Configuration of electrode film |
| --- | --- |
| Experimental Example 1-1 | Li-SiO$_2$ |
| Experimental Example 1-2 | Li-TiO$_2$ |
| Experimental Example 1-3 | Li-Mg-Si |
| Experimental Example 1-4 | Li-Bi |
| Experimental Example 1-5 | Li-Ge |
| Experimental Example 1-6 | Li-Ti$_3$C$_2$ |
| Experimental Example 1-7 | Li-Sn-SnO$_2$ |
| Experimental Example 1-8 | Li-Mo |
| Experimental Example 1-9 | Li-CuO |
| Experimental Example 1-10 | Li-Mg |
| Experimental Example 1-11 | Li-Al-Al$_2$O$_3$ |
| Experimental Example 1-12 | Li-graphene |

Figure 7:
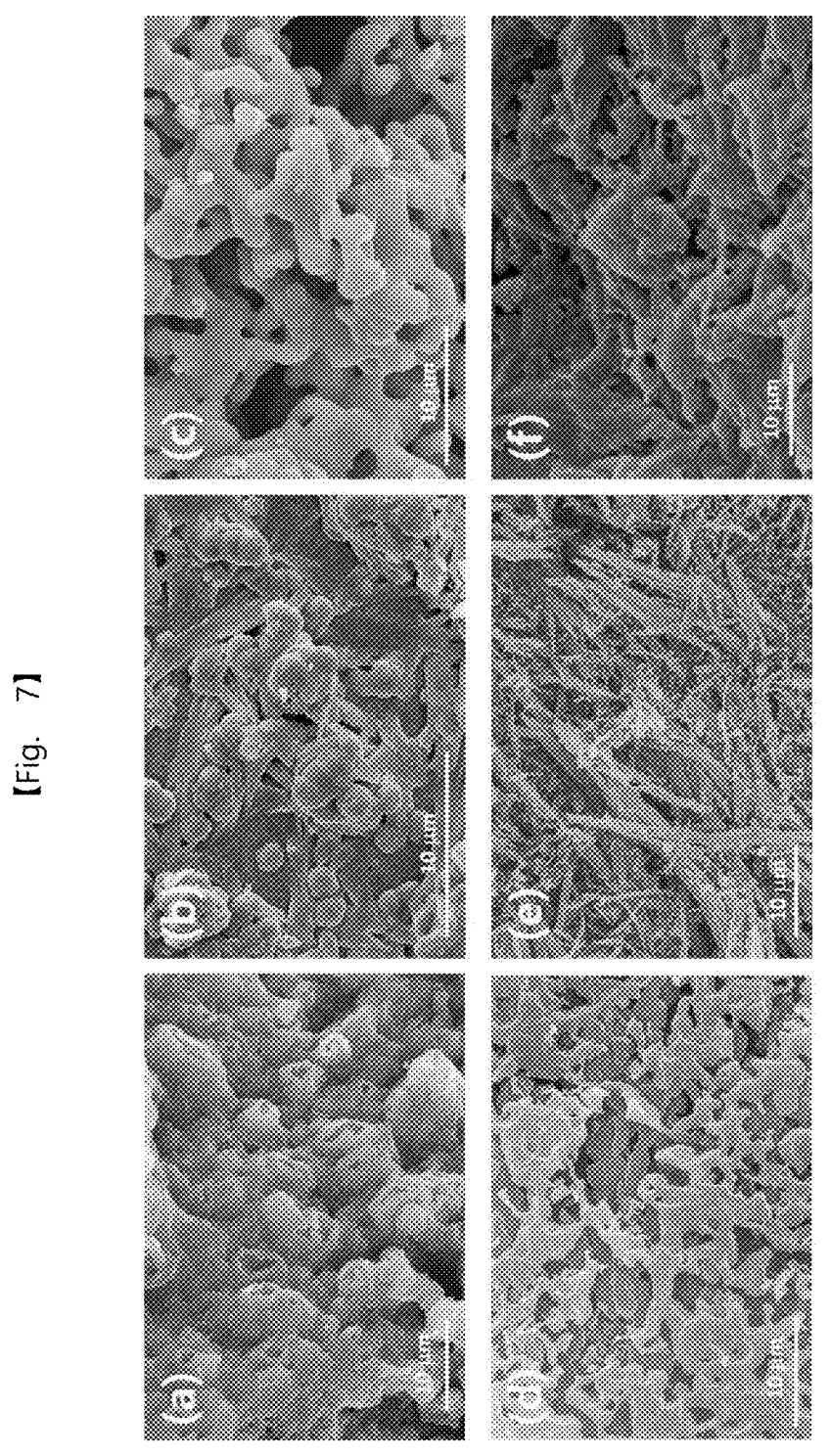
Figure 8:
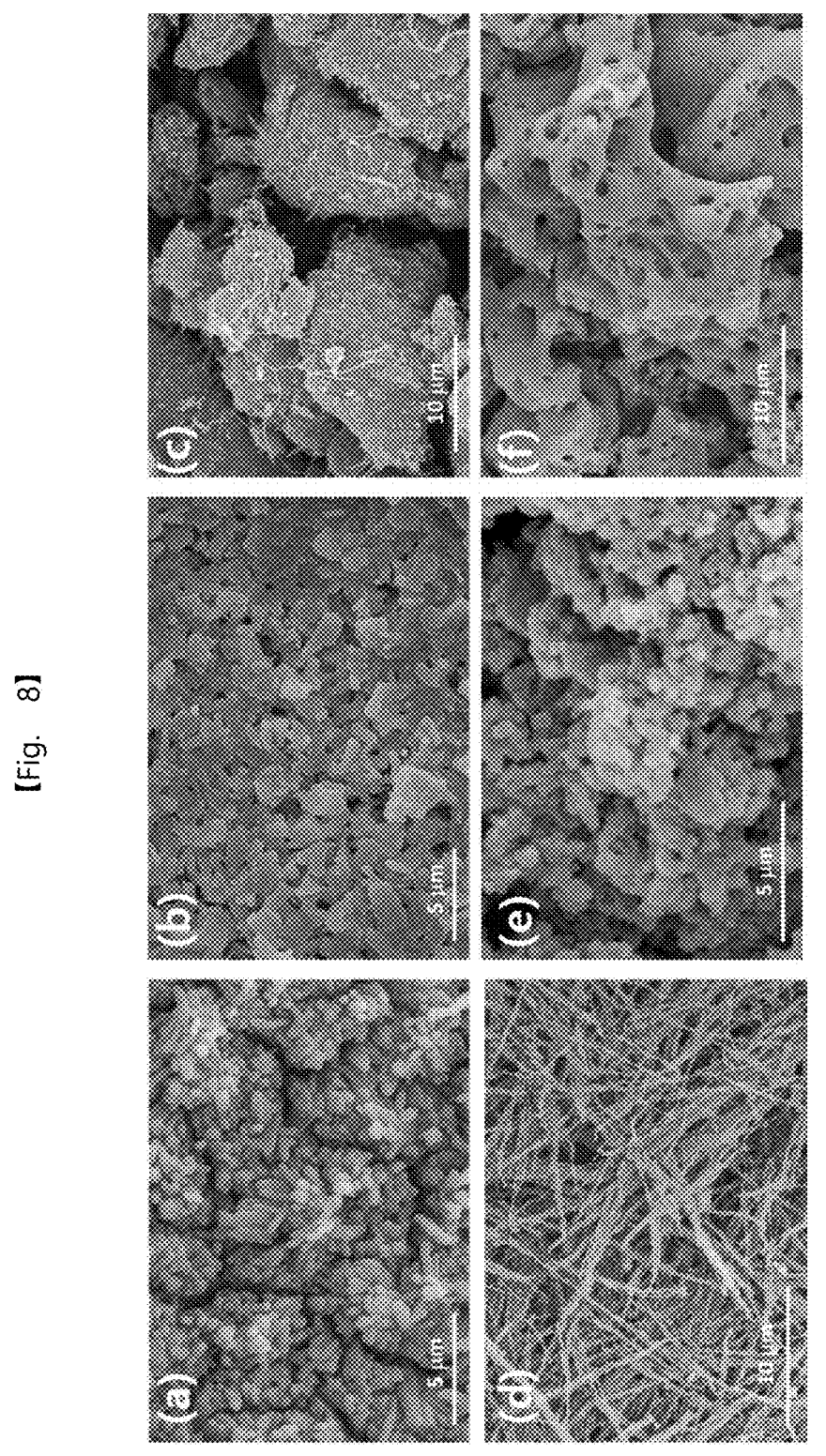

FIG. 7 is a view showing an SEM picture of an electrode film according to Experimental Examples 1-1 to 1-6 of the present application, and FIG. 8 is a view showing an SEM picture of an electrode film according to Experimental Examples 1-7 to 1-12 of the present application.

Referring to FIGS. 7 and 8, (a) to (f) of FIG. 7 show pictures of an electrode film according to Experimental Examples 1-1 to 1-6 of the present application, and (a) to (f) of FIG. 8 show pictures of an electrode film according to Experimental Examples 1-7 to 1-12 of the present application.

Referring to FIGS. 7 and 8, it can be confirmed that the element and lithium contained in the base particle are in an alloy state to stably form a three-dimensional structure. In addition, it can be seen that the structure of the finally produced electrode film may be controlled depending on the type of element included in the base particle. Specifically, it can be confirmed that the electrode film including the Li—Ge alloy according to Experimental Example 1-5 and the electrode film including the Li—Mg alloy according to Experimental Example 1-10 have a needle-like three-dimensional structure extending in one direction.

FIGS. 9 to 20 are graphs for explaining charge/discharge properties of a second battery including an electrode film according to Experimental Examples 1-1 to 1-12 of the present application, respectively.

Referring to FIGS. 9 to 20, a cell was produced by disposing the electrode films according to Experimental Examples 1-1 to 1-12 described above on both sides, and the charge/discharge properties were evaluated and coulombic efficiency was measured at a current density of 1 mAcm$^{-2}$ and a capacity of 2 mAhcm$^{-2}$.

As can be understood from FIGS. 9 to 20, it can be confirmed that the cell including electrode films according to Experimental Examples 1-1 and 1-12 is stably driven for a long time. In particular, it can be confirmed that the cell is stably driven for a long time in case of including an electrode film containing the Li—SiO$_2$ alloy of Experimental Example 1-1, an electrode film containing the Li—TiO$_2$ alloy of Experimental Example 1-2, an electrode film including the Li—Mg—Si alloy of Experimental Example 1-3, an electrode film including the Li—Ti$_3$C$_2$ alloy of Experimental Example 1-6, and an electrode film including the Li—CuO alloy of Experimental Example 1-9.

FIG. 21 is a graph for comparing and explaining charge/discharge properties of a second battery including an electrode film according to Experimental Examples 1-1 to 1-3, 1-6 and 1-9 of the present application.

Referring to FIG. 21, a cell was produced by using the electrode film according to Experimental Examples 1-1 to 1-3, 1-6, and 1-9, and a ThF electrolyte, and charge/discharge was performed 120 times under 1 C condition.

As can be understood from FIG. 21, it can be confirmed that a secondary battery including the electrode films according to Experimental Examples 1-1 to 1-3, 1-6, and 1-9 has a high capacity of 2700 mAhg$^{-1}$ or more and has retention properties as high as 98% or more, even after performing 120 charge/discharge cycles.

As a result, it can be confirmed that the secondary battery including the lithium alloy electrode film produced according to the embodiment of the present application has a high charge/discharge capacity and a long lifespan.

Hereinafter, an electrode using an electrode powder produced according to a specific experimental example based on the second and third embodiments of the present application as described above, and the evaluation of properties will be described accordingly.

Production of Electrode Powder and Electrode According to Experimental Example 1-13

LiNO$_3$ was prepared as a lithium compound, carbon black was prepared as a conductive material, PVDF was prepared as a binder, and NMP was prepared as a solvent. A copper foil was prepared as a current collector.

LiNO$_3$, carbon black, and PVDF were mixed into NMP at a ratio of 6:2:2 wt % to produce a source material.

A source material was coated on a copper foil and dried at 60° C. to produce a LiNO$_3$ powder negative electrode according to Experimental Examples 1-13.

Production of Electrode Powder and Electrode According to Experimental Example 1-14

A LiCl powder negative electrode according to Experimental Example 1-14 was produced by the same method as in Experimental Example 1-13, except for using a lithium compound.

FIG. 22 is a graph for explaining charge/discharge properties of a second battery including an electrode according to Experimental Example 1-13 of the present application, and FIG. 23 is a graph for explaining charge/discharge properties of a second battery including an electrode according to Experimental Example 1-14 of the present application.

Referring to FIGS. 22 and 23, a cell was produced by disposing the electrodes according to Experimental Examples 1-13 and 1-14 described above on both sides, and the charge/discharge properties were evaluated and coulombic efficiency was measured at a current density of 1 mAcm$^{-2}$ and a capacity of 2 mAhcm$^{-2}$.

As can be understood from FIGS. 22 and 23, it can be confirmed that a cell including the electrodes according to Experimental Examples 1-13 and 1-14 is stably driven for a long time. In other words, it can be seen that a negative electrode may be produced in the atmosphere through a simple method by using the lithium compound in a powder state, and even in this case, the cell may be stably driven.

FIG. 24 is a graph for comparing and explaining charge/discharge properties of a second battery including electrodes according to Experimental Examples 1-13 and 1-14 of the present application.

Referring to FIG. 24, a cell was produced by using the electrodes according to Experimental Examples 1-13 and 1-14, and a ThF electrolyte, and charge/discharge was performed 100 times under 1 C condition.

As can be understood from FIG. 24, it can be confirmed that the secondary battery including the LNO$_3$ powder of Experimental Example 1-13 and the secondary battery including the LiCl powder of Experimental Example 1-14 have a high charge/discharge capacity of 2500 mAhg$^{-1}$ or more. In addition, it can be seen that the capacity and lifespan properties of the secondary battery including the LNO$_3$ powder of Experimental Examples 1-12 are more excellent than those of the secondary battery including the LiCl powder of Experimental Examples 1-14.

Production of Electrode Powder and Electrode According to Experimental Example 1-15

Rice and leaves thereof were prepared as biomass and hydrochloric acid was prepared as an acidic solution.

In an oxygen atmosphere, rice and leaves thereof were heat-treated at 300° C. for one hour and treated with hydrochloric acid to produce a porous silicon oxide having a three-dimensional structure. The porous silicon oxide having a three-dimensional structure and magnesium powder were mixed and heated in a nitrogen gas atmosphere at 600° C. for three hours. After that, a high concentration hydrochloric acid (37 wt %, 12M) as a cleaning solution was provided for 10 minutes to remove a magnesium phase, wash with ethanol, and dry in a vacuum atmosphere, thereby producing an electrode powder according to Experimental Example 1-15 having an activated three-dimensional structure.

Carbon black was prepared as a conductive material, and lithium polyacrylate was prepared as a binder.

After that, an electrode according to Experimental Example 1-15 was produced by mixing the electrode powder according to Experimental Example 1-15, a conductive material, and a binder at a ratio of 6:2:2 and coating on a current collector.

Production of Electrode Powder and Electrode According to Experimental Example 1-16

A silicon-magnesium alloy electrode powder according to Experimental Example 1-16 was produced by the same method as in Experimental Example 1-15, except for providing a low concentration hydrochloric acid (1M) as a cleaning solution for one hour to leave magnesium.

After that, an electrode according to Experimental Example 1-16 was produced by mixing the electrode powder according to Experimental Example 1-16, a conductive material, and a binder at a ratio of 8:1:1 and coating on a current collector.

Production of Electrode Powder and Electrode According to Experimental Example 1-17

$Ti_3AlC_2$ was prepared as a metal precursor, and LiF was prepared as a solvent.

LiF and $Ti_3AlC_2$ were slowly added to 6M hydrochloric acid and reacted at 40° C. for 30 minutes. Then, after ultrasonic treatment, $Ti_3C_2$ nanosheet electrode powder according to Experimental Examples 1-17 was produced.

After that, an electrode according to Experimental Example 1-17 was produced by mixing the electrode powder according to Experimental Example 1-17, a conductive material, and a binder at a ratio of 7:1:2 and coating on a current collector.

Production of Electrode Powder and Electrode According to Experimental Example 1-18

$Bi(NO_3)_3$ was prepared as a metal precursor, PEG6000 was prepared as a polymer, and nitric acid was prepared as a solvent.

0.02M $Bi(NO_3)_3$, 0.03 g of PEG6000, and 0.25M nitric acid were mixed for 30 minutes and left at 80° C. for one hour. After that, the reactant was filtered, washed with deionized water, and dried in a vacuum to produce a Bi nanosheet electrode powder according to Experimental Examples 1-18.

After that, an electrode according to Experimental Example 1-18 was produced by mixing the electrode powder according to Experimental Example 1-18, a conductive material, and a binder at a ratio of 8:1:1 and coating on a current collector.

Production of Electrode According to Experimental Example 1-19

Aluminum powder was purchased to produce an electrode according to Experimental Example 1-19 by the same method as in Experimental Example 1-15.

The electrode powder according to Experimental Examples 1-15 to 1-19 may be summarized as shown in <Table 1> below.

TABLE 2

| Classification | Electrode powder |
| --- | --- |
| Experimental Example 1-15 | Si |
| Experimental Example 1-16 | Mg-Si |
| Experimental Example 1-17 | $Ti_2C_3$ |
| Experimental Example 1-18 | Bi |
| Experimental Example 1-19 | Al (commercial product) |

FIG. 25 is a view showing an SEM picture of an electrode powder according to Experimental Examples 1-15 to 1-18 of the present application.

Referring to FIG. 25, SEM pictures were taken of the electrode powders according to Experimental Examples 1-15 to 1-18.

As can be understood from FIG. 25, it can be confirmed that the electrode powders according to Experimental Examples 1-15 to 1-18 have a three-dimensional porous structure. Compared with the Si electrode powder of Experimental Example 1-15, it can be confirmed that the network of the Mg—Si electrode powder of Experimental Examples 1-16 is rather thick. In addition, it can be confirmed that $Ti_2C_3$ electrode powder of Experimental Example 1-17 and Bi electrode powder of Experimental Example 1-18 are formed in a plate shape.

FIGS. 26 to 29 are graphs for explaining charge/discharge properties of a second battery including an electrode according to Experimental Examples 1-15 to 1-18 of the present application, respectively.

Referring to FIGS. 26 to 29, a cell was produced by disposing the electrodes according to Experimental Examples 1-15 to 1-18 described above on both sides, and the charge/discharge properties were evaluated and coulombic efficiency was measured at a current density of 1 mAcm-2 and a capacity of 2 mAhcm-2.

As can be understood from FIGS. 26 to 29, it can be confirmed that a cell including the electrodes according to Experimental Examples 1-15 to 1-18 is stably driven for a long time. In particular, it can be confirmed that a cell including the Si electrode powder of Experimental Example 1-15 and the Mg—Si electrode powder according to Experimental Example 1-16 is stably driven for a long time.

FIG. 30 shows graphs for comparing and explaining charge/discharge properties of a second battery including an electrode according to Experimental Examples 1-15 to 1-19 of the present application.

Referring to FIG. 30, a cell was produced by using the electrodes according to Experimental Examples 1-15 to 1-19, and a ThF electrolyte, and charge/discharge was performed 100 times under 1 C condition.

As can be understood from FIG. 30, it can be confirmed that a secondary battery including the electrode powders according to Experimental Examples 1-15 to 1-19 is stably driven. In particular, it can be confirmed that a secondary battery including an Si electrode powder of Experimental Example 1-15 and a Mg—Si electrode powder of Experimental Example 1-16 has a capacity of 3404 mAhg$^{-1}$ and 3550 mAhg$^{-1}$, respectively and has retention properties of 93% and 97%, respectively even after performing 100 charge/discharge cycles.

Hereinafter, according to specific experimental examples of the present application, a solid electrolyte including a compound in which various cations and anions are bound, and results of evaluating their properties will be described.

Preparing of Compound According to Experimental Example 2-1

Acetonitrile was provided into a conical flask, after which dichloromethane was added and stirred at room temperature for 10 minutes to prepare a solution containing an alkyl group. In this case, the preparation of the solution containing the alkyl group was performed in a glove box without moisture.

Thiophene was dripped into the solution containing the alkyl group while being stirred, after which a uniformly mixed solution was slowly stirred at room temperature for four days so as to prepare thiophenium salt having a methyl group which is a cation source.

A washing process was performed by providing the thiophenium salt and a solvent of ethyl acetate and diethyl ether into a rotary concentrator.

1M hydrofluoric acid and extra water were added into a conical flask and stirred for 10 minutes to prepare a fluorohydrogenate precursor which is an anion source.

Thiophenium salt was added into the fluorohydrogenate precursor to prepare a mixed solution. The mixed solution was left alone at a temperature of −70° C. for 24 hours, so as to prepare a compound in which thiazolium salt and the fluorohydrogenate were bound as an intermediate product of the solid electrolyte.

The compound was provided into a glove box under a nitrogen atmosphere and left alone at room temperature for two to three hours, so that volatile gas was removed. After that, a drying process was performed by providing the compound into the rotary concentrator, so as to prepare a compound according to Experimental Example 2-1, in which a thiophenium cation having a methyl group (R1) and a fluorohydrogenate anion are bound.

Preparing of Compound According to Experimental Example 2-2

A compound was prepared by the same method as described above in Experimental Example 2-1. However, ethyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 2-2, in which a thiophenium cation having an ethyl group (R1) and a fluorohydrogenate anion are bound.

Preparing of Compound According to Experimental Example 2-3

A compound was prepared by the same method as described above in Experimental Example 2-1. However, propyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 2-3, in which a thiophenium cation having a propyl group (R1) and a fluorohydrogenate anion are bound.

Preparing of Compound According to Experimental Example 2-4

A compound was prepared by the same method as described above in Experimental Example 2-1. However, butyl chloride was provided instead of dichloromethane. In addition, in the preparing of thiophenium, a reaction was performed at a temperature of 60 to 80° C. for two to three days instead of the reaction at room temperature for four days, so as to prepare the compound according to Experimental Example 2-4, in which a thiophenium cation having a butyl group (R1) and a fluorohydrogenate anion are bound.

Preparing of Compound According to Experimental Example 3-1

A compound was prepared by the same method as described above in Experimental Example 2-1, but thiazoline was added into a solution containing an alkyl group so as to prepare thiazolium salt as a cation source.

After that, thiazolium salt and a fluorohydrogenate precursor were reacted by the same method as described above in Experimental Example 2-1, so as to prepare the compound according to Experimental Example 3-1, in which a thiazolium cation having a methyl group (R1) and a fluorohydrogenate anion are bound.

Preparing of Compound According to Experimental Example 3-2

A compound was prepared by the same method as described above in Experimental Example 2-2, but thiazoline was added into a solution containing an alkyl group so as to prepare thiazolium salt as a cation source.

After that, thiazolium salt and a fluorohydrogenate precursor were reacted by the same method as described above in Experimental Example 2-2, so as to prepare the compound according to Experimental Example 3-2, in which a thiazolium cation having an ethyl group (R1) and a fluorohydrogenate anion are bound.

Preparing of Compound According to Experimental Example 3-3

A compound was prepared by the same method as described above in Experimental Example 2-3, but thiazoline was added into a solution containing an alkyl group so as to prepare thiazolium salt as a cation source.

After that, thiazolium salt and a fluorohydrogenate precursor were reacted by the same method as described above in Experimental Example 2-3, so as to prepare the compound according to Experimental Example 3-3, in which a thiazolium cation having a propyl group (R1) and a fluorohydrogenate anion are bound.

Preparing of Compound According to Experimental Example 3-4

A compound was prepared by the same method as described above in Experimental Example 2-4, but thiazoline was added into a solution containing an alkyl group so as to prepare thiazolium salt as a cation source.

After that, thiazolium salt and a fluorohydrogenate precursor were reacted by the same method as described above in Experimental Example 2-4, so as to prepare the compound according to Experimental Example 3-4, in which a thiazolium cation having a butyl group (R1) and a fluoro-hydrogenate anion are bound.

Preparing of Compound According to Experimental
Example 4-1

Phospholanium was provided as a cation, and fluorohy-drogenate prepared according to Experimental Example 2-1 as described above was used as an anion, so as to prepare the compound according to Experimental Example 4-1, in which a phospholanium cation having a methyl group (R1) and an ethyl group (R2) and a fluorohydrogenate anion are bound.

Preparing of Compound According to Experimental
Example 4-2

A compound was prepared by the same method as described above in Experimental Example 4-1, so as to prepare the compound according to Experimental Example 4-2, in which a phospholanium cation having a methyl group (R1) and a propyl group (R2) and a fluorohydrogenate anion are bound.

Preparing of Compound According to Experimental
Example 4-3

A compound was prepared by the same method as described above in Experimental Example 4-1, so as to prepare the compound according to Experimental Example 4-3, in which a phospholanium cation having a methyl group (R1) and a butyl group (R2) and a fluorohydrogenate anion are bound.

Preparing of Compound According to Experimental
Example 4-4

A compound was prepared by the same method as described above in Experimental Example 4-1, so as to prepare the compound according to Experimental Example 4-4, in which a phospholanium cation having an ethyl group (R1) and a butyl group (R2) and a fluorohydrogenate anion are bound.

Preparing of Compound According to Experimental
Example 4-5

A compound was prepared by the same method as described above in Experimental Example 4-1, so as to prepare the compound according to Experimental Example 4-5, in which a phospholanium cation having a methyl group (R1) and a methyl group (R2) and a fluorohydrogenate anion are bound.

Preparing of Compound According to Experimental
Example 5-1

Oxathiolanium represented by <Formula 8> was provided as a cation, and fluorohydrogenate prepared according to Experimental Example 2-1 as described above was used as an anion, so as to prepare the compound according to Experimental Example 5-1, in which an oxathiolanium cation having a methyl group (R1) and a fluorohydrogenate anion are bound.

Preparing of Compound According to Experimental
Example 5-2

A compound was prepared by the same method as described above in Experimental Example 5-1, so as to prepare the compound according to Experimental Example 5-2, in which an oxathiolanium cation having an ethyl group (R1) and a fluorohydrogenate anion are bound.

Preparing of Compound According to Experimental
Example 5-3

A compound was prepared by the same method as described above in Experimental Example 5-1, so as to prepare the compound according to Experimental Example 5-3, in which an oxathiolanium cation having a propyl group (R1) and a fluorohydrogenate anion are bound.

Preparing of Compound According to Experimental
Example 5-4

A compound was prepared by the same method as described above in Experimental Example 5-1, so as to prepare the compound according to Experimental Example 5-4, in which an oxathiolanium cation having a butyl group (R1) and a fluorohydrogenate anion are bound.

Preparing of Compound According to Experimental
Example 6-1

Thiazolidinium was provided as a cation, and fluorohy-drogenate prepared according to Experimental Example 2-1 as described above was used as an anion, so as to prepare the compound according to Experimental Example 6-1, in which a thiazolidinium cation having a methyl group (R1) and an ethyl group (R2) bound to a nitrogen element, and two methyl groups bound to a sulfur element, and a fluo-rohydrogenate anion are bound.

Preparing of Compound According to Experimental
Example 6-2

A compound was prepared by the same method as described above in Experimental Example 6-1, so as to prepare the compound according to Experimental Example 6-2, in which a thiazolidinium cation having a methyl group (R1) and a propyl group (R2) bound to a nitrogen element, and two methyl groups bound to a sulfur element, and a fluorohydrogenate anion are bound.

Preparing of Compound According to Experimental
Example 6-3

A compound was prepared by the same method as described above in Experimental Example 6-1, so as to prepare the compound according to Experimental Example 6-3, in which a thiazolidinium cation having a methyl group (R1) and a butyl group (R2) bound to a nitrogen element, and two methyl groups bound to a sulfur element, and a fluorohydrogenate anion are bound.

Preparing of Compound According to Experimental
Example 6-4

A compound was prepared by the same method as described above in Experimental Example 6-1, so as to prepare the compound according to Experimental Example 8-4, in which a thiazolidinium cation having an ethyl group (R1) and a butyl group (R2) bound to a nitrogen element, and two methyl groups bound to a sulfur element, and a fluorohydrogenate anion are bound.

The ion conductivity of the compounds according to Experimental Examples 2-1 to 6-4 was measured at room temperature, and the ion molecular weight of cations and the state information of the compounds according to Experimental Examples 2-1 to 6-4 are summarized as shown in <Table 3>.

a methyl group/ethyl group, a methyl group/propyl group, and a methyl group/butyl group is included (Experimental Examples 6-1 to 6-3).

Thiophenium having a methyl group identified as having the highest ion conductivity in <Table 3> was fixed as a

TABLE 3

| Classification | Cation | Alkyl group | Ion molecular weight (g/mol) | State | Ion conductivity (mS/cm²) |
|---|---|---|---|---|---|
| Experimental Example 2-1 | Thiophenium | Methyl group | 99.15 | Crystalline solid | 126 |
| Experimental Example 2-2 | | Ethyl group | 113.14 | Crystalline solid | 103 |
| Experimental Example 2-3 | | Propyl group | 127.15 | Crystalline solid | 68 |
| Experimental Example 2-4 | | Butyl group | 142.16 | Crystalline solid | 46 |
| Experimental Example 3-1 | Thiazolium | Methyl group | 101.13 | Crystalline solid | 45 |
| Experimental Example 3-2 | | Ethyl group | 114.14 | Crystalline solid | 74 |
| Experimental Example 3-3 | | Propyl group | 126.15 | Crystalline solid | 18.9 |
| Experimental Example 3-4 | | Butyl group | 143.13 | Crystalline solid | 6.8 |
| Experimental Example 4-1 | Phospholanium | Methyl group/ Ethyl group | 130.97 | Crystalline solid | 2 |
| Experimental Example 4-2 | | Methyl group/ Propyl group | 143.1 | Crystalline solid | 35 |
| Experimental Example 4-3 | | Methyl group/ Butyl group | 159.9 | Crystalline solid | 16 |
| Experimental Example 4-4 | | Ethyl group/ Butyl group | 174 | Crystalline solid | 45 |
| Experimental Example 4-5 | | Methyl group/ Methyl group | 117 | Crystalline solid | 24 |
| Experimental Example 5-1 | Oxathiolanium | Methyl group | 106.06 | Crystalline solid | 12 |
| Experimental Example 5-2 | | Ethyl group | 120.07 | Crystalline solid | 17.5 |
| Experimental Example 5-3 | | Propyl group | 132.06 | Crystalline solid | 26.5 |
| Experimental Example 5-4 | | Butyl group | 149.06 | Crystalline solid | 21.1 |
| Experimental Example 6-1 | Thiazolidinium | Methyl group/ Ethyl group Methyl group/ Methyl group | 99.15 | Crystalline solid | 60 |
| Experimental Example 6-2 | | Methyl group/ Propyl group Methyl group/ Methyl group | 113.14 | Crystalline solid | 19.6 |
| Experimental Example 6-3 | | Methyl group/ Butyl group Methyl group/ Methyl group | 127.15 | Crystalline solid | 28.7 |
| Experimental Example 6-4 | | Ethyl group/ Butyl group Methyl group/ Methyl group | 142.16 | Crystalline solid | 5.8 |

As can be understood from <Table 3>, it can be confirmed that compounds have a high ion conductivity, if thiophenium is included as a cation (Experimental Examples 2-1 to 2-4), if thiazolium having a methyl group, an ethyl group, or a propyl group is included (Experimental Examples 3-1 to 3-3), if phospholanium having a methyl group/propyl group, a methyl group/butyl group, an ethyl group/butyl group, or a methyl group/methyl group is included (Experimental Examples 4-2 to 4-5), if oxathiolanium having an ethyl group, a propyl group, or a butyl group is included (Experimental Examples 5-2 to 5-4), and if a thiazolidinium having cation and a type of anion was varied to prepare a compound for a solid electrolyte according to Experimental Examples 7-1 to 7-2.

Preparing of Compound According to Experimental Example 7-1

Cyano(nitroso)methanide was provided as an anion so as to prepare a compound according to Experimental Example 7-1 in which a thiophenium cation having a methyl group according to Experimental Example 2-1 as described above and a cyano(nitroso)methanide anion are bound.

Preparing of Compound According to Experimental Example 7-2

Tetrazolidine was provided as an anion so as to prepare a compound according to Experimental Example 7-2 in which a thiophenium cation having a methyl group according to Experimental Example 2-1 as described above and a tetrazolidine anion are bound.

The ion conductivity of the compounds according to Experimental Examples 7-1 to 7-2 was measured at room temperature, and the molecular weight of anions, the state information of the compounds according to Experimental Examples 7-1 to 7-2 are summarized as shown in <Table 4>.

TABLE 4

| Classification | Anion | Ion Molecular weight (g/mol) | State | Ion conductivity (mS/cm²) |
|---|---|---|---|---|
| Experimental Example 1-1 | Fluorohydrogenate | 63 | Crystalline solid | 126 |
| Experimental Example 7-1 | Cyano(nitro) methanide | 69 | Crystalline solid | 48.6 |
| Experimental Example 7-2 | Tetrazolidine | 72 | Crystalline solid | 69.4 |

As can be understood from <Table 4>, it can be confirmed that compounds have a high ion conductivity, if fluorohydrogenate is included as an anion (Experimental Example 2-1), if cyano(nitroso)methanide is included (Experimental Example 7-1), and if tetrazolidine is included (Experimental Examples 7-2).

Preparing of Solid Electrolyte According to Experimental Example 8-1

A 1M hydrofluoric acid aqueous solution and lithium chloride (LiCl) were added into a container and left alone at a temperature of −70° C. for 24 hours, so as to prepare lithium fluorohydrogenate.

A compound having a methyl group according to Experimental Example 2-1 described above was heated to 60° C. and lithium fluorohydrogenate was added in an amount of 1 mol % at the same time and reacted for two hours, so as to prepare a solid electrolyte according to Experimental Example 8-1.

Preparing of Solid Electrolyte According to Experimental Example 8-2

A solid electrolyte was prepared by the same method as described above in Experimental Example 8-1. However, lithium fluorohydrogenate was added in an amount of 5 mol % instead of mol %, so as to prepare a solid electrolyte according to Experimental Example 8-2.

Preparing of Solid Electrolyte According to Experimental Example 8-3

A solid electrolyte was prepared by the same method as described above in Experimental Example 8-1. However, lithium fluorohydrogenate was added in an amount of 10 mol % instead of mol %, so as to prepare a solid electrolyte according to Experimental Example 8-3.

FIG. 31 is a differential scanning calorimetry (DSC) graph showing a compound according to Experimental Example 2-1 and a solid electrolyte according to Experimental Example 8-3 of the present application.

Referring to FIG. 31, a solid-liquid or solid-solid state change depending on a temperature may be observed in the compound according to Experimental Example 2-1 and the solid electrolyte according to Experimental Example 8-3.

As shown in FIG. 31, a solid-liquid state change was observed at 90° C. in the compound of Experimental Example 2-1. In contrast, a solid-liquid state change was observed at 70° C. in the solid electrolyte of Experimental Example 8-3.

In addition, a solid-solid state change was observed twice in the compound of Experimental Example 2-1, and specifically it can be seen that the compound of Experimental Example 2-1 has a first crystal phase in a temperature range of 28 to 90° C. and a second crystal phase in a temperature range of 22 to 2812. In contrast, a solid-solid state change was observed once in the solid electrolyte of Experimental Example 8-3, and it can be confirmed that the solid electrolyte has one crystal phase in a temperature range of 22 to 7012.

FIG. 32 is a DSC graph showing a compound according to Experimental Examples 7-1 and 7-2 of the present application.

Referring to FIG. 32, a state change of compounds according to Experimental Examples 7-1 and 7-2 was observed depending on a temperature.

As can be understood from FIG. 32, it can be confirmed that the compounds according to Experimental Examples 7-1 and 7-2 stably maintain a solid crystal phase in a relatively wide range of temperatures. Specifically, it can be confirmed that the compound according to Experimental Example 7-1 and the compound according to Experimental Example 7-2 stably maintain a solid crystal phase −15 to 98° C. and at −59 to 129° C., respectively. In addition, the compounds according to Experimental Examples 7-1 and 7-2 have a somewhat low ion conductivity compared to the compound according to Experimental Example 2-1, but stably maintain a crystal phase in a range of temperatures wider than the range of temperatures (28 to 90° C.) in which the compound according to Experimental Example 2-1 stably maintains a first crystal phase as shown in FIG. 20. Accordingly, the compounds according to Experimental Examples 7-1 and 7-2 can be useful in military or space fields, or low-temperature environments such as a polar region.

FIG. 33 is a view for explaining a crystal structure of a solid electrolyte according to Experimental Examples 8-1 to 8-3 of the present application.

Referring to FIG. 33, the solid electrolytes according to Experimental Examples 8-1 to 8-3 may include a thiophenium cation, a fluorohydrogenate anion and lithium salt.

A unit cell of the compound in which a thiophenium cation and a fluorohydrogenate anion are bound may have an orthorhombic crystal structure, in which the thiophenium cation may be provided at a vertex of the crystal structure and at a center of a face thereof, and the fluorohydrogenate anion may be provided in a middle of an edge of the crystal structure. In this case, the solid electrolyte of Experimental Examples 8-1 to 8-3 may have the lithium salt optionally provided at interstitial sites of the crystal structure. Specifically, the lithium salt may include lithium fluorohydrogenate.

The lithium salt may be provided at the interstitial sites of the crystal structure of the compound, and thus may easily move within the crystal structure. Accordingly, an ion conductivity may increase as an addition amount of the lithium fluorohydrogenate, which is lithium salt, increases.

FIG. 34 is a graph showing an ion conductivity of a compound according to Experimental Example 2-1 and a solid electrolyte according to Experimental Examples 8-1 to 8-3 of the present application depending on a temperature.

Referring to FIG. 34, a lithium ion conductivity was measured with regard to a compound according to Experimental Example 2-1 and a solid electrolyte according to Experimental Examples 8-1 to 8-3. As described above with reference to FIG. 33, lithium fluorohydrogenate may be optionally provided at interstitial sites in the crystal structure of the compound of the solid electrolyte of Experimental Examples 8-1 to 8-3. Accordingly, it was observed that lithium fluorohydrogenate may easily move within the crystal structure, and thus, when an addition amount of lithium fluorohydrogenate is increased, an ion conductivity becomes higher.

In this case, lithium fluorohydrogenate may move to interstitial sites in the crystal structure where lithium fluorohydrogenate is not provided, and may exhibit a high ion conductivity. Thus, as the interstitial sites provided with lithium fluorohydrogenate increase, a rate of increase in ion conductivity may reach saturation. In other words, as shown in FIG. 34, it can be confirmed that the ion conductivity substantially reaches saturation, if an addition amount of the lithium fluorohydrogenate is 5 mol % or more.

FIG. 35 is a picture of a electrolyte membrane coated with a solid electrolyte according to Experimental Example 8-1 of the present application.

Referring to FIG. 35, a picture was taken of a solid electrolyte membrane in the form of a film in which a solid electrolyte according to Experimental Example 8-1 of the present application is coated on a polytetrafluoroethylene (PTFE) resin. In this case, it was confirmed that the solid electrolyte membrane maintains the softness and transparency of the resin.

Although the present application has been described in detail with reference to exemplary embodiments, the scope of the present application is not limited to a specific embodiment and should be interpreted by the attached claims. In addition, those skilled in the art should understand that many modifications and variations are possible without departing from the scope of the present application.

INDUSTRIAL APPLICABILITY

The electrode according to an embodiment of the present application may be used as an electrode for a secondary battery, a super capacitor or the like.

The invention claimed is:

1. A method for producing an electrode, the method comprising:
   preparing a base particle;
   forming a coating layer, including a first metal, on a surface of the base particle by mixing the base particle with a coating source which includes the first metal;
   heat treating a second metal and the base particle on which the coating layer is formed, thereby melting the second metal and the base particle on which the coating layer is formed, and thereby forming a molten source intermediate product; and
   coating the molten source intermediate product onto a current collector, thereby forming the electrode,
   wherein the base particle comprises at least any one of silicon oxide, aluminum oxide, copper, copper oxide, titanium, titanium oxide, titanium carbide, tin oxide, bismuth, or molybdenum.

2. The method of claim 1, wherein the first metal and the second metal are a same metal element.

3. The method of claim 1, wherein
   the method further comprises pre-treating the base particle with a metal nitric acid solution before mixing the base particle with the coating source.

4. The method of claim 1, wherein the first metal and the second metal comprise lithium.

5. The method of claim 4, wherein the coating source comprises a compound of lithium, nitrogen, fluorine, sulfur, carbon, and oxygen.

6. The method of claim 1, wherein the base particle and the coating source are heat-treated at a temperature higher than room temperature after being mixed.

* * * * *